US012061586B2

(12) United States Patent
Samwel et al.

(10) Patent No.: US 12,061,586 B2
(45) Date of Patent: Aug. 13, 2024

(54) K-D TREE BALANCED SPLITTING

(71) Applicant: Databricks, Inc., San Francisco, CA (US)

(72) Inventors: Bart Samwel, Oegstgeest (NL); Prakhar Jain, Sunnyvale, CA (US)

(73) Assignee: Databricks, Inc., San Francisco, CA (US)

( * ) Notice: Subject to any disclaimer, the term of this patent is extended or adjusted under 35 U.S.C. 154(b) by 28 days.

(21) Appl. No.: 17/738,609

(22) Filed: May 6, 2022

(65) Prior Publication Data

US 2023/0359602 A1    Nov. 9, 2023

(51) Int. Cl.
*G06F 16/22* (2019.01)
*G06F 16/28* (2019.01)

(52) U.S. Cl.
CPC ........ *G06F 16/2246* (2019.01); *G06F 16/285* (2019.01)

(58) Field of Classification Search
CPC ... G06F 16/278; G06F 16/285; G06F 16/2246
USPC .......... 707/693, 756, 797, 968, 972
See application file for complete search history.

(56) References Cited

U.S. PATENT DOCUMENTS

| | | | | |
|---|---|---|---|---|
| 10,223,377 | B1* | 3/2019 | Moghe | G06F 16/185 |
| 2011/0268298 | A1* | 11/2011 | Imanishi | H04S 7/00 381/303 |
| 2013/0054544 | A1* | 2/2013 | Li | G06F 3/0674 707/693 |
| 2017/0251209 | A1* | 8/2017 | Andersson | H04N 19/176 |
| 2018/0260398 | A1* | 9/2018 | Faibish | G06F 16/122 |
| 2020/0081615 | A1* | 3/2020 | Lu | G06F 9/452 |
| 2023/0039065 | A1* | 2/2023 | Dascal | A61B 8/5246 |

* cited by examiner

*Primary Examiner* — Phong H Nguyen
(74) *Attorney, Agent, or Firm* — Fenwick & West LLP

(57) ABSTRACT

A system for clustering data into corresponding files comprises one or more processors and a memory. The one or more processors is/are configured to: 1) determine to cluster a set of data into a set of files; 2) determine a set of split points in a corresponding set of dimensions of the set of data to determine the set of files, wherein each file of the set of files has an approximate target size; and 3) store one or more items of the set of data into a corresponding file of the set of files based at least in part on the set of split points. The memory is coupled to the one or more processors and configured to provide the processor with instructions.

20 Claims, 14 Drawing Sheets

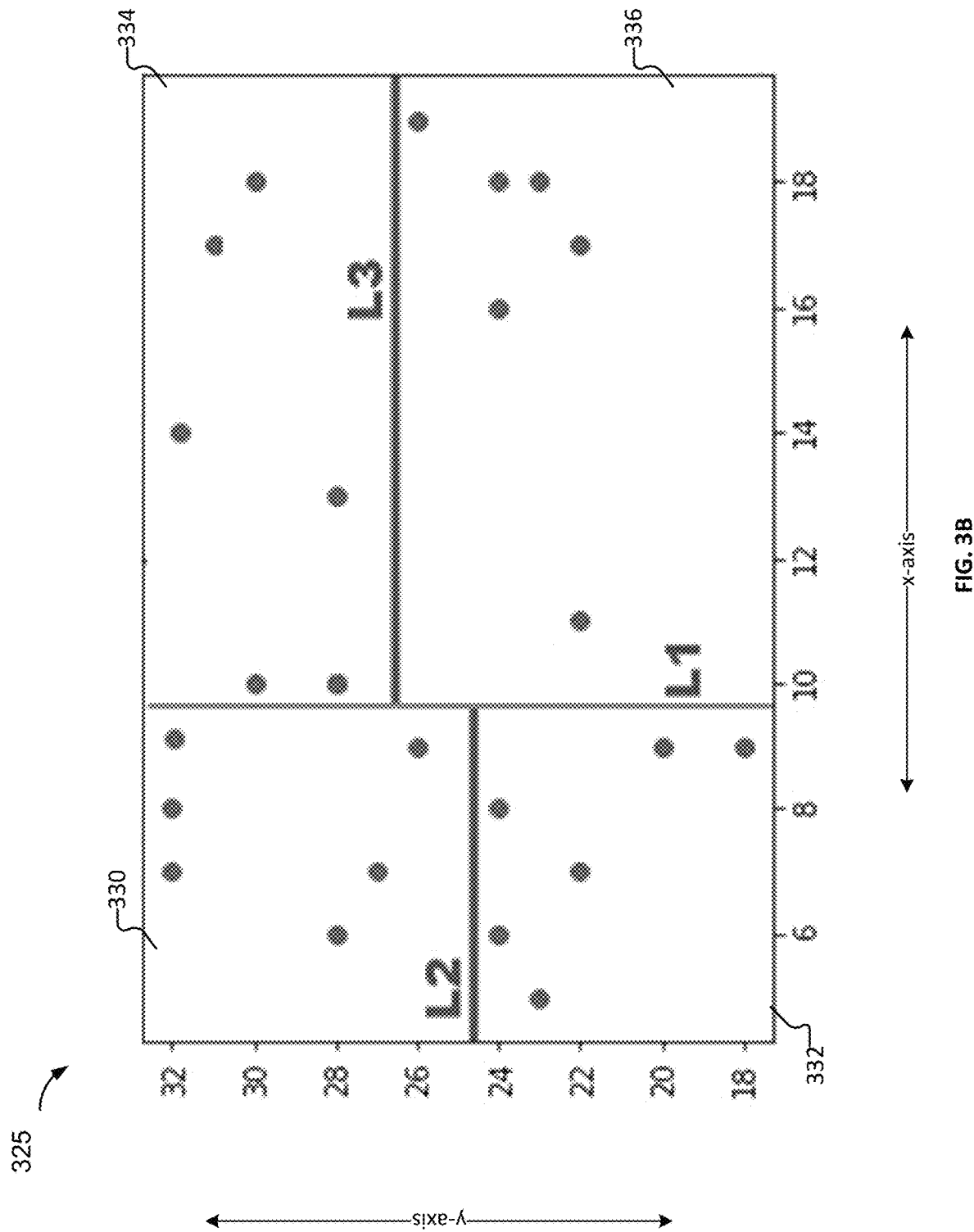

K-D TREE BALANCED SPLITTING

BACKGROUND OF THE INVENTION

A system for big data processing comprises a system for deployments of applications, configurations, one or more datasets, and model(s) used in connection with analyzing the data. Systems generally split data corresponding to a dataset into many files to facilitate efficient data storage and retrieval allowing smaller reads and writes than the entire dataset. However, in some cases, this creates a problem where efficiency is lost in response to a data request when a large number or all of the files need to be read.

BRIEF DESCRIPTION OF THE DRAWINGS

Various embodiments of the invention are disclosed in the following detailed description and the accompanying drawings.

FIG. 3B is an illustration of 2-way splitting of a data space along a second dimension according to various embodiments of the present application.

DETAILED DESCRIPTION

Figure 1:
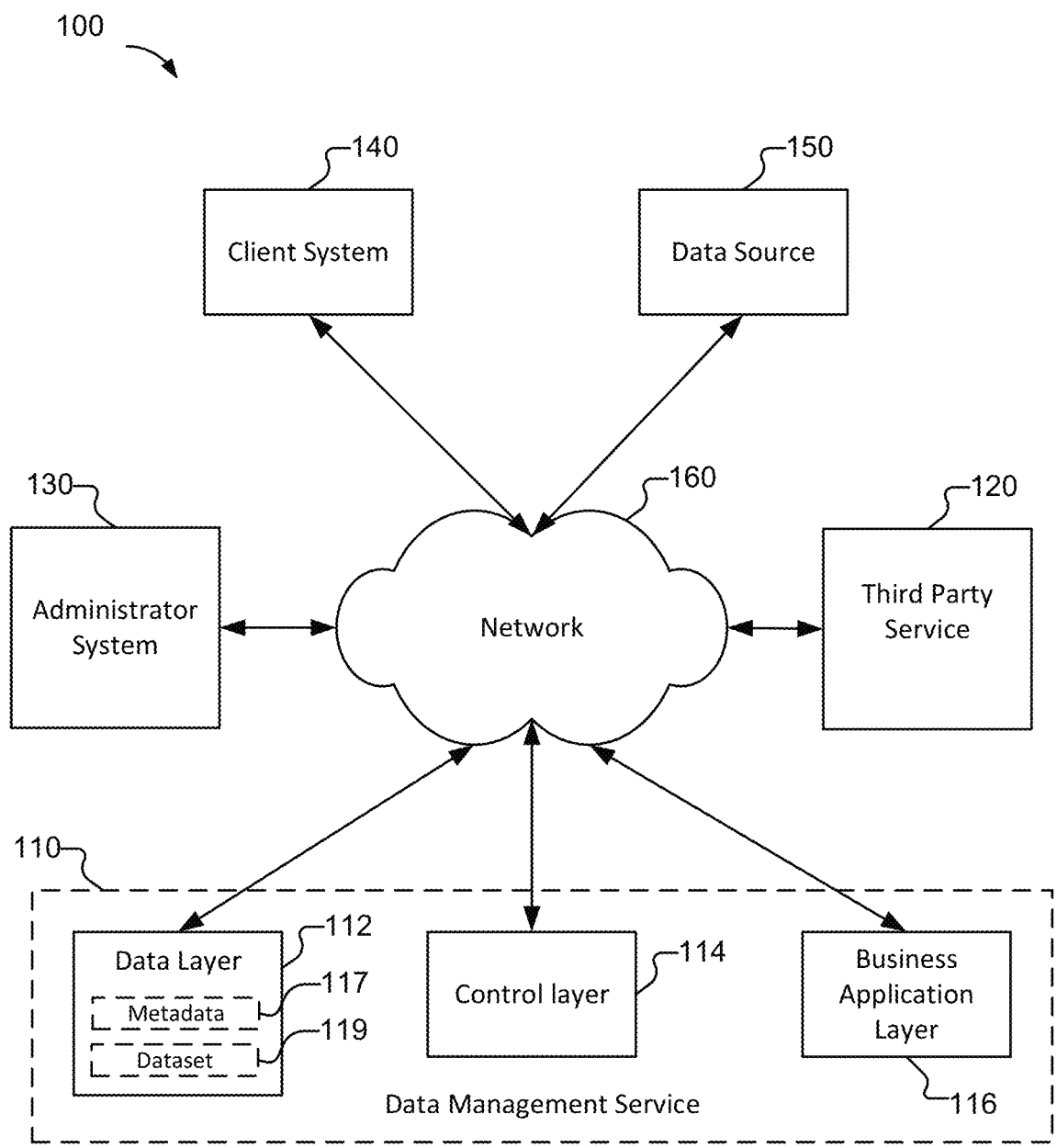
FIG. 1 is a block diagram of a system for clustering data into corresponding files according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a key may correspond to a variable or characteristic associated with a dataset. In some embodiments, the key is used to filter the dataset to obtain a subset of data that satisfies a constraint on the key. For example, in the case of the dataset being a table, the key can be a row or a column in the table, or both. As another example, the key can be a combination of rows, a combination of columns, or a combination of one or more rows and one or more columns. As another example, the key can be a value derived from a column or from a combination of columns using a function specified in a programming language. A data set may have one key, or it may a have multiple keys. In some embodiments, the multiple keys are used to filter the dataset to obtain a subset of data that satisfies the constraints on the multiple keys. In some embodiments, a subset of one or more of the multiple keys is used to filter the dataset to obtain a subset of data that satisfies the constraints on the subset of the multiple keys.

As used herein, a leaf may correspond to a node on a tree with no child nodes. In some embodiments, a leaf is a logical construct denoting a data space (e.g., a partition of a larger data space) comprising a set of data to be stored in a corresponding file.

Related art systems when storing a large dataset store the large dataset in a plurality of files. The dataset is split up into the plurality of files, in general, into that have overlapping boundaries for the range of key values contained in the files. For example, related art systems cluster data into files such that bounding boxes for files partially overlap. In the case of overlapping bounding boxes for a plurality of files, in connection with determining the file in which particular data (e.g., within the overlapping region of the bounding boxes), each of the files having at least partially overlapping bounding boxes will need to be checked (e.g., accessed) to determine whether the file(s) comprise the desired particular data. Thus, related art systems that implement overlapping boundaries (e.g., bounding boxes) can lead to inefficient data retrieval. As an example, for a dataset having two dimensions (e.g., an x-dimension and a y-dimension), a first file can have a bounding box of x_min=5, x_max=9, y_min=4, and y_max=6, and a second file can have a bounding box of x_min=4, x_max=7, y_min=3, and y_max=5. In some embodiments, every key of the dataset is a dimension for the bounding boxes. According to such a clustering, the first file and second file have partially overlapping bounding boxes. Accordingly, in response to a query for data for a filtering criterion corresponding to data within the area of the bounding boxes that overlap, the system is required to read both the first file and the second file in order to determine which file(s) comprise(s) the desired data. As an example, when trying to find a file that may comprise data for which y=3, the system iterates through a list of files to see where a maximum of y is >=3, and for which a min is <=3. Note that these checks are made efficient by having each file store metadata indicating minimum and maximum values for each variable or dimension in the file. A file with a minimum value of y=5, would thus not include a record for which y=3.

Various embodiments cluster data into corresponding files to facilitate quick and efficient retrieval of data from a dataset to satisfy a filter criterion without reading all files for the dataset. In some embodiments, the data is clustered in a manner that only a small set of one or more files are accessed to retrieve data (e.g., rather than having to read all files). In various embodiments, cluster data for a dataset into a plurality of files in a manner that the system enforces a non-overlapping of boundaries (e.g., bounding boxes, etc.). Accordingly, the clustering of data according to various embodiments improves the efficiency and speed for data retrieval (e.g., in response to user queries such as for data having a particular key value or range of key values).

According to various embodiments, clustering data for a dataset into a plurality of files comprises clustering records of data into the plurality of files. For example, points/items in a data space can correspond to a record, and the data space is partitioned in a manner that the bounding boxes for the partitions are non-overlapping. In response to determining a partitioning of the data space, the system stores records comprised in a particular partition (e.g., a record within the bounding box of the partition) into a file corresponding to the particular partition.

A system for clustering data into corresponding files is disclosed. The system comprises one or more processors and a memory. The one or more processors is/are configured to: 1) determine to cluster a set of data into a set of files; 2) determine a set of split points in a corresponding set of dimensions of the set of data to determine the set of files, wherein each file of the set of files has an approximate target size; and 3) store one or more items of the set of data into a corresponding file of the set of files based at least in part on the set of split points. The memory is coupled to the one or more processors and configured to provide the processor with instructions. In some embodiments, the set of split points splits the set of data into N groups along a dimension of the set of dimensions. In some embodiments, N comprises an integer greater than 1. In some embodiments, N comprises 2 and/or 3. In some embodiments, the one or more processors are further configured to store information pertaining to boundaries for a plurality of files in the set of files and delete information of structure of a decision tree along which the set of files is split. In some embodiments, the information pertaining to the boundaries for the plurality of files includes a minimum value for a first variable of the set of data and a maximum value for the first variable of the set of data for each of the plurality of files. In some embodiments, boundaries for files (e.g., adjacent files or files with data with values adjacent to a next file along a dimension that the data is being split) of the set of files are non-overlapping. In some embodiments, the one or more processors are further configured to determine an expected file size and its relation to the approximate target size (e.g., is the expected size as determined by simulation or sampling and simulation larger or smaller than the approximate target size, is the expected size as determined by simulation or sampling and simulation larger or smaller than a maximum size or a minimum size, is the expected size within a percentage difference from the approximate target size, etc.). In some embodiments, the one or more processors is/are further configured to determine a number of splits to perform with respect to a first dimension before a split is performed with respect to another dimension of the plurality of dimensions, the number of splits being determined based at least in part on the expected file size. In some embodiments, a first partition of the set of data along with respect to the first dimension is determined based at least in part on the expected file size. In some embodiments, the set of data is split with respect to the first dimension more times than the set of data is split with respect to another dimension of the plurality of dimensions. In some embodiments, the set of split points of the set of data is determined based at least in part on a distribution of a plurality of records comprised in the set of data. In some embodiments, the set of split points is determined based on a plurality of weightings respectively associated with the plurality of records. In some embodiments, the plurality of weightings is determined based on sizes for the corresponding plurality of records. In some embodiments, wherein the one or more processors is/are further configured to: store information pertaining to boundaries for the set of files; receive a request to provide an indication of a file to be accessed in order to obtain a subset of the information having a particular value with respect to a dimension of the set of data; and determine the file to be accessed based at least in part on the indication. In some embodiments, the file to be accessed is determined based on a querying of the information pertaining to the boundaries to identify the file for which the particular value is within corresponding boundaries along the dimension. In some embodiments, the one or more processors are configured to determine a bias with respect to a biased dimension along which the set of data is split more than other dimensions of the set of data. In some embodiments, the bias is determined based at least in part on a user setting that is configured based on a user input. In some embodiments, the set of data is recursively split in the set of dimensions until corresponding partitions of the set of data are less than or equal to the approximate target size. In some embodiments, the subset middle point of the first data subset is determined based on a number of records within the set of data. In some embodiments, a record comprises information corresponding to one or more values respectively corresponding to one or more dimensions.

According to various embodiments, a system, method, and/or device for clustering data into corresponding files is disclosed. The system comprises one or more processors and a memory. The one or more processors are configured to (i) obtain an approximate target size, (ii) recursively split the data into partitions according to a plurality of keys (e.g., dimensions) of the data until the partitions (e.g., each partition) satisfies the approximate target size, (iii) store the partitions of data into corresponding files, and (iv) store metadata associated with the files. In some embodiments, the metadata corresponding to a particular file includes boundary information for one or more keys (e.g., boundaries along various dimensions of the data). As an example, the metadata corresponding to a particular file includes boundary information for each of the keys or dimensions of the data space. In some embodiments, determining that the partitions satisfy the expected file size includes determining that a size of the data comprised in a given partition is less than or approximately equal to the expected file size. In some embodiments, recursively splitting the data includes varying a dimension along which the data is split at each splitting iteration. As an example, recursively splitting the data includes alternatively splitting the data along a first dimension and a second dimension. In some embodiments, the splitting is not strictly alternating—for example, the splitting is occurs in a sequence of different dimensions that does not strictly alternate; so instead of a sequence of dimensions for splitting like dimension 1, dimension 2, dimension 1, dimension 2, etc. the sequence might be dimension 1, dimension 2, dimension 1, dimension 1, dimension 2, dimension 1, dimension 1, etc. or if more dimensions are involved instead of 1, 2, 3, 1, 2, 3, 1, 2, 3, etc. the sequence might be 1, 2, 3, 1, 2, 1, 3, 1, 2, 1, 3, 1, etc.

According to various embodiments, a system, method, and/or device for clustering data into corresponding files is disclosed. The system comprises one or more processors and a memory. The one or more processors are configured to (i) determine to cluster a set of data into a set of files, (ii) determine a data space associated with the set of data, (iii) determine a first location at which to split the set of data in a first dimension of the plurality of dimensions, wherein the first location is determined based at least in part on a middle point of the set of data, and splitting the set of data at the first location obtains a first data subset (e.g., a first partition of the data space) and a second data subset (e.g., a second partition of the data space) (iv) determine a second location at which to split the first data subset in a second dimension of the plurality of dimensions, wherein the second location is determined based at least in part on a subset middle point of the first data subset, and (v) store one or more items of the set of data into a corresponding file of the set of files based at least in part on the first location, the second location.

Various embodiments split a data space (e.g., an initial data space and a data space of a partition of the initial data space) along a plurality of dimensions. The dimensions along which the data space is split can correspond to a plurality of keys of the dataset. The system iteratively/recursively splits the data space (e.g., using a simulation) to determine an expected file size until the collective size of records comprised within the partitions of the data space satisfy a predefined criterion such as an approximate target size. After each split during the iterative/recursive splits, the system determines whether to further split the data space and/or a location at which the data space is to be (further) split. Determining the location at which the data space is to be split can include determining a dimension along which the data space (e.g., an initial data space and a data space of a partition of the initial data space) is to be split and/or a determining a location of the data space at which the data space is to be split along such dimension. In some embodiments, the location at which the data space is to be split is determined based at least in part on one or more pieces of data (e.g., records) within the data space. Various embodiments determine the location at which to split the data space based at least in part on one or more split points (e.g., a midpoint, one-third/two third points, quartile points, etc.) with respect to the pieces of data comprised in the data space being split. In some embodiments, the splitting is determined based on a random sample of the original data. In some embodiments, the size of the sample must be chosen so that there are enough samples to represent the data space in enough detail. In some embodiments, there should be at least a threshold worth of samples for each amount of actual data of expected partition size. For example, if the expected partition size is 128 MB, then the system may require at least 50 samples for each 128 MB of data.

According to various embodiments, the one or more split points (e.g., a midpoint, one-third/two third points, quartile points, etc.) can be determined based on whether the pieces of data are the same size (e.g., within a threshold amount or threshold number of standard deviations of a particular record size). In some embodiments, if the pieces of data are the same size (or roughly the same size, such as based on a variation of the sizes of the pieces of data), then the system determines the location at which to the split the data space based at least in part on the median piece of data (e.g., a location of the median piece of data). For example, in the case of a 2-way split, the system uses a key value for the median piece of data as a boundary at which the data space is to be split. The use of the median piece of data splits the data space so that, in the case of an even number of pieces of data in the data space, each partition comprises half of the pieces of data. In the case of an odd number of pieces of data (e.g., 2n+1 pieces of data, where n is a positive integer) in the data space, the use of the median piece of data splits the data space so that a first partition comprises n records, and a second partition comprises n+1 records. If the pieces of data are not roughly the same size, then splitting the data space at a location corresponding to a boundary of a partition comprising the median data piece can result in a skew among sizes of files obtained from the recursive splitting process. Another interesting case is when multiple data pieces have identical key values. In that case there are several possible methods for partitioning the data: 1) unevenly, by splitting the data at a value boundary—for example, if the values are 5, 6, 7, 7, 7, 8, 9, then the split could be into {5, 6} and {7, 7, 7, 8, 9}, or {5, 6, 7, 7, 7} and {8, 9}; or 2) evenly, by using other criteria as "tie breakers" to divide the records (e.g., the other criteria could include values from other key columns, or randomly or deterministically assigned numbers for each record). In some embodiments, this method results in an overlapping bounding box between the partitions on either side of the dimension that was split. In some embodiments, extending the above from the 2-way case to the N-way case can be used to split the data along a given dimension into N approximately same-sized groups. In various embodiments, N is an integer other than one, N is a prime number other than 1, N is any other appropriate integer value.

According to various embodiments, if the pieces of data within a data space are not the same size (or roughly the same size), then the system determines a location at which to split the data space based at least in part on a weighted split point(s) among the pieces of data of the data space. If the variance of the sizes of the pieces of data comprised within the data space exceeds a threshold variance (e.g., if the pieces are not all the same size), the system uses weighted split point(s) as the split point(s) at which to split the data space. In some embodiments, the weighted split point(s) can correspond to partitions using the center of mass of the pieces of data within the data space. For example, the weighted split point(s) can be determined based at least in part on respective weightings for the pieces of data within the data space. As another example, the weighted split point(s) can be determined based on a summation of the sizes of the pieces of data within the data space and determining a piece of data comprising split point(s) of the aggregate size of the pieces of data. As an illustrative example of such a determination of the weighted midpoint for a 2-way split, suppose the data space comprises 7 pieces of data that have an aggregated size of 122 MB, the weighted midpoint corresponds to a location of a piece of data at which an aggregated size of a subset of pieces of data (e.g., the pieces of data being summed in an order based on a direction along a particular dimension of the data space) is 61 MB.

In some embodiments, the system determines a bias (e.g., a splitting preference) with respect to a manner by which data in a dataset is to be clustered based on a data management policy or a user setting. The data management policy or user setting can be configured based on input from a user (e.g., an administrator) or based on a request from another system (e.g., a third-party service that may be a data source), such as a request sent by the other system to a storage system that requests the storage system to store the data comprised in the dataset. The bias can indicate a dimension of the dataset along which the dataset is preferentially split (e.g., split more than splitting performed in other directions). In some embodiments, in the case of the dataset comprising a plurality of dimensions along which the data is to be split, the system can use biases corresponding to one or more dimensions. For example, in the case of a splitting of a dataset along three dimensions, the system can split the dataset in a first dimension four times more than the dataset is to be split in a third dimension in each iteration, and the system can split the dataset in a second dimension two times more than the dataset is to be split in the third dimension. An example of a splitting according to such a bias is: (i) splitting the dataset in the first dimension; (ii) splitting the dataset in the first dimension, (iii) splitting the dataset in the second dimension, (iv) splitting the dataset in the first dimension, (v) splitting the dataset in the first dimension, (vi) splitting the dataset in the second dimension, (vii) splitting the dataset in the third dimension, and (viii) splitting the dataset sequentially in the first, second, and third dimension and repeating this step until the various partitions of the dataset satisfy an approximate target size. The system can iterate over (i)-(viii) until the various partitions of the dataset to determine an expected file size and its relation to an approximate target size.

Another example of a bias splitting to achieve a fixed 4× more split is to split by the first dimension two times more overall. For instance:

1. Split by dimension 1;
2. Split by dimension 1;
3. Split by dimension 1;
4. Split by dimension 2;
5. Split by dimension 2;
6. Split by dimension 3; and
7. Split normally, alternating over dimensions 1, 2, 3.

The extra splits can be done immediately or done at other points in the tree, as long as the product of the split factors for dimension 1 is increased by the bias factor. For example:

1. Split by dimension 1 (split factor 2);
2. Split by dimension 1 (split factor 2);
3. Split by dimension 2 (split factor 2);
4. Split by dimension 3 (split factor 2);
5. Split normally by dimensions 1, 2, 3 (split factor 2 for each dimension);
6. Split by dimension 1 (split factor 2);
7. Split by dimension 1 (split factor 2);
8. Split by dimension 2 (split factor 2);
9. Split by dimension 3 (split factor 2); and
10. Split normally, alternating over dimensions 1, 2, 3 (split factor 2 for each dimension).

Here, dimension 1 gets an extra split factor of 2× in step 2, and another extra split factor of 2× in step 7, for a total of 4× extra splitting.

In some embodiments, it is also possible to split the data along a dimension in a different number of partitions—for example, the following procedure would cause dimension 1 to be biased 2.5 times (split 2.5× more than the other dimensions):

1. Split by dimension 1 into 5 parts. (split factor 5);
2. Split by dimension 2 (split factor 2);
3. Split by dimension 3 (split factor 2); and
4. Split normally, alternating over dimensions 1, 2, 3 (split factor 2 for each dimension).

In some embodiments, the system determines a bias with respect to a manner by which data in a dataset is to be clustered based at least in part on an approximate target size and/or a data management policy or a user setting. For example, if the system knows the size of data and the approximate target size, the system can determine the number of files into which the data is to be clustered. The system can then determine whether to preferentially split the data in a particular dimension(s) over another dimension(s), such as in order to obtain the desired number of files. As an example, the system determines that a dataset comprises 100 GB of data that is to be clustered cluster on three dimensions (e.g., three columns). If the approximate target size is 128 MB, then the system determines that the data is to be clustered across (e.g., stored among) 800 files. As an example, if the system determines that by sequentially splitting the dataset along a set of dimensions equally would cause the system to perform a last split along a dimension that results in a particular dimension being split more than the other dimensions, then data will have a 2× bias with respect to the dimension along which the data was last split. The system may determine that such a bias is too great (e.g., exceeds a bias threshold). In response to such a determination, the system determines a sequence of splitting that results in a bias less than (or less than or equal to) the (predefined) bias threshold. For example, if the bias threshold corresponds to a splitting in a first dimension that is 1.5× the splitting in a second dimension, the system may determine that splitting the data in the first dimension 3 ways for every two splits in the second dimension will result in the bias threshold being satisfied. For example, splitting {1, 2, 3, 4, 5, 6, 7, 8} 3 ways once might be: {1, 2, 3}, {4, 5, 6}, {7, 8}. Note that the problem with splitting more times is that the splitting factor (total parts into which a dimension is split) for every dimension is always a power of 2, so this will always end up with a bias that is a power of 2. If the split uses more ways, then a splitting factor can be achieved that is not a power of 2, so for example it is possible to have one dimension with a splitting factor of 3*2=6 (split once in 3 parts, once in 2 parts) and another dimension with a splitting factor of 2*2=4 (split twice into two parts), with a bias of only 1.5 instead of 2. More optimal ratios can be achieved by, for example, splitting 3*3=9 (split two times into three parts each time) vs 2*2*2=8 (split three times into two parts each time), which yields a bias ratio of 9/8.

In various embodiments, 2-way, 3-way, N-way splitting is used for a given dimension, where N is an integer (e.g., 2, 3, 4, 5, 6, 7, 8, 9, 10, 20, 30, etc.), or any other appropriate splitting. In various embodiments, N is an integer other than one, N is a prime number other than 1, or N is any other appropriate integer value.

According to various embodiments, the system stores metadata associated with files (e.g., each file) into which the data of a dataset is clustered. In some embodiments, the metadata comprises boundary information for the file. For example, the metadata comprises boundary information with respect to one or more keys of the data. In some embodiments, the metadata comprises a minimum value and a maximum value with respect to a key of the data for data comprised in a corresponding file. For example, for each key of the data, the metadata comprises a minimum value and a maximum value for the data comprised in the file. According to various embodiments, the boundary information for files corresponding to a dataset are non-overlapping (e.g., at least with respect to one key). In some embodiments, the boundary information for files corresponding to a dataset are non-overlapping with respect to all keys or dimensions along which the dataset is split. The non-overlapping of boundaries across files corresponding to a dataset facilitates a quick look-up for file(s) comprising particular data. For example, requests for data corresponding to a particular key value corresponding to a key (or range of key values) can be quickly processed to determine the files comprising such data. The system uses the metadata (e.g., the boundary information) for a set of files to determine a subset of one or more files for which the particular key value intersects.

In some embodiments, the system performs a look-up with respect to data corresponding to files associated with a dataset (e.g., a data space) in connection with determining a file that comprises particular data (e.g., a particular data item/record, or data satisfying one or more criteria with respect to a key/dimension such as data having a value with respect to a key less than a defined value, etc.). The system can receive a request for the particular data or for an indication of file(s) comprising the particular data. For example, the system can receive from a user or other system a request comprising one or more criteria for data being requested (e.g., a data item/record having a particular value with respect to a key of the dataset). In response to determining that the system is to perform a look-up to determine a file comprising particular data (e.g., in response to receiving the request for particular data), the system obtains metadata for files corresponding to the dataset (e.g., a dataset in which the particular data is comprised). The system determines the file(s) comprising the particular data based at least in part on the metadata. For example, the system determines the file(s) comprising the particular data based at least in part on the metadata pertaining to the file(s) of a dataset and one or more key values corresponding to the particular data. In some embodiments, the system uses boundary information comprised in the metadata in connection with determining file(s) comprising data that satisfies criteria associated with the data request (e.g., file(s) for which the key value is within the corresponding boundaries of the file(s)).

According to various embodiments, in response to determining the file(s) comprising the particular data, the system provides an indication of file(s) in which the particular data is comprised. In some embodiments, the providing the indication of the file(s) comprises communicating the file(s) to a user or system (e.g., a client system or a third-party service) associated with the request for the particular data. In some embodiments, providing the indication of the file(s) comprises providing a location at which the file(s) are accessible. The providing a location at which the file(s) are accessible can include generating a Uniform Resource Locator (URL) and providing the URL to the user or system (e.g., a client system or a third-party service) associated with the request for the particular data. The URL may be configured to be signed with, or otherwise comprise, a credential with which the user or other system is to access the file(s).

After the system clusters data comprised in a dataset among a plurality of files, the system may receive new data, such as new records to include in the dataset. In some embodiments, in response to receiving a new record to store in connection with the dataset, the system writes the new record (e.g., each new record) to a corresponding file. For example, the system determines the file in which to store new record based at least in part on a determination of a file having boundary information that would bound the key value(s) of the new record. The system can use the key value(s) for the new record in connection with querying the metadata for the file having boundary information matching the key value(s) for the new record. Over time, the updating of files created during an initial clustering of data in a dataset to include new records can cause skew among the files if the new records are stored in single file or a small set of files (e.g., the new records are not uniformly distributed across all files).

According to various embodiments, the system rebalances the pieces of data (e.g., records). For example, in response to determining that one file is relatively heavy (e.g., exceeds a predefined size threshold), the system can redistribute the data such as according to an optimal file size.

In some embodiments, in response to determining that a particular file exceeds a predefined threshold size (e.g., the simulated expected file size), the system further splits the particular file into sub-files. The system can perform a splitting process similar to, or the same as, the recursive splitting of the initial dataset to a plurality of files. For example, the system determines a data space corresponding to the file that is relatively heavy, and the system recursively splits the data space corresponding to the file until a partition (e.g., each partition) comprises data that has an aggregated size less than a desired file size (e.g., the approximate target size), and then the system stores the data for each of such partitions to the corresponding files (e.g., the sub files of the relatively heavy file).

In some embodiments, in response to determining that a particular file exceeds a predefined threshold size, the system obtains the metadata corresponding to the files for a dataset, the system determines a data space for the dataset and re-performs the clustering of the dataset (including the new records that caused the unbalancing). As an example, the system reconstitutes the data space using the records comprised in the initial dataset and the records added after the initial clustering process was performed, and then the system performs the clustering process (e.g., recursively splits the data space—for example, simulating the expected file size—until the system determines partitions that satisfy the approximate target size). In some embodiments, the above approach of (a) re-splitting just the files that are too heavy; and (b) re-clustering all the data; is supplemented by a third hybrid approach, where a subset of the partitions is re-clustered.

In some embodiments, newly received records are not stored in files into which the initial dataset was clustered. Rather, the newly received records are used in connection with determining a new data space, and the data within such data space is clustered into a plurality of corresponding files. In such an implementation, it is possible that the files for the new data space have overlapping boundary information (e.g., bounding box) with respect to files for the initial data space. Accordingly, if the updated records are clustered according to such a process, in response to a request for particular data, the system queries the respective metadata for the initial data space and the new data space to determine which file(s), if any, are expected to comprise data responsive to the request for data.

Various embodiments improve the clustering of data within a dataset to across a plurality of files to enable a quicker and more efficient data retrieval. For example, in response to receiving a query for particular data (e.g., a record satisfying a criterion of the query), the system prevents files from having overlapping bounding boxes, and thus the specific file(s) to be accessed for data retrieval can more quickly be determined.

FIG. 1 is a block diagram of a system for clustering data into corresponding files according to various embodiments of the present application. According to various embodiments, system 100 implements at least part of process 400 of FIG. 4, process 500 of FIG. 5, process 600 of FIG. 6, process 700 of FIG. 7A, process 750 of FIG. 7B, process 800 of FIG. 8A, process 820 of FIG. 8B, process 850 of FIG. 8C, and/or process 900 of FIG. 9.

In the example illustrated in FIG. 1, system 100 includes data management service 110, third-party service 120, administrator system 130, client system 140, and/or data source 150. In some embodiments, data management service 110, and/or data source 150 are integrated (e.g., combined into a layer or a single set of server(s)). System 100 further includes one or more networks such as network 160 over which administrator system 130 and/or client system 140 communicates with data management service 110, third-party service 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, data management service 110 comprises data layer 112, control layer 114, and business application layer 116. Data layer 112, control layer 114, and/or business application layer 116 can be respectively implemented by one or more servers. In some implementations, data layer 112, control layer 114, and/or business application layer 116 by a same set of one or more servers.

According to various embodiments, data management service 110 manages data with respect to one or more datasets. Data management service 110 can receive requests to store one or more datasets from data source 150 and/or third-party service 120. Data source 150 and/or third-party service 120 can be connected to data management service 110 via a connector, such as an application programming interface (API). In some embodiments, data management service 110 provides data (or access to data such as via a link) in response to data requests. For example, the data requests can be communicated to data management service 110 by client system 140, or a data requesting service, such as third-party service 120. Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other data consuming clients.

According to various embodiments, data management service 110 clusters data comprised in datasets across a plurality of files. Data management service 110 manages the data in a manner that data retrieval is quick and efficient. In some embodiments, data management service 110 uniformly (or nearly uniformly) distributes the data across a plurality of files. The plurality of files can have non-overlapping boundaries, which may facilitate quicker data retrieval by limiting the number of files that are to be accessed to retrieve data. Data management service 110 can divide a data space comprising the various pieces of data (e.g., records) of the dataset into a plurality of partitions comprising the same number of pieces of data or same aggregated size of the pieces of data in the corresponding partition, etc. Data management service 110 stores the pieces of data (e.g., records) for the partitions in a corresponding file. For example, each partition corresponds to a single file in which the associated pieces of data are stored. In some embodiments, data management service 110 stores metadata (e.g., metadata 117) associated with each file (or corresponding data space partition). The metadata can be used in connection with determining a file in which a particular piece of data, or a piece of data satisfying a query criterion (e.g., a filtering criterion), is stored.

In some embodiments, data management service 110 uses control layer 114 to determine a clustering of the data across a plurality of files (e.g., into corresponding partitions/data spaces), and data management service 110 uses data layer 112 to store the plurality of files (e.g., in dataset 119) and corresponding metadata (e.g., metadata 117).

In response to determining that data management service 110 is to store data in a dataset (e.g., in response to determining to cluster a set of data into a set of files), control layer 114 determines a data space corresponding to the dataset (e.g., a range of values in a plurality of dimensions for the various records comprised in the dataset), and control layer 114 splits the dataset into partitions (e.g., locally determines partitions). According to various embodiments, control layer 114 obtains (e.g., determines through simulation) an expected file size and recursively splits the data into partitions according to a plurality of keys (e.g., dimensions) of the data until the partitions (e.g., each partition) satisfies the approximate target size. The approximate target size can be predefined according to a data management policy, or otherwise configured by a user (e.g., an administrator) or other system for which the dataset is stored. In response to determining the locations at which the data space is to be split (e.g., in response to determining the partitions or boundary information thereof), such information is provided to data layer 112, which data management service 110 uses to store the data across the set of files.

In some embodiments, in connection with clustering the data into a set of files, control layer 114 determines a data space associated with the set of data and determines a first location at which to split the set of data in a first dimension of the plurality of dimensions. The first location is determined based at least in part on a middle point of the set of data. The splitting of the set of data at the first location obtains a first data subset (e.g., a first partition of the data space) and a second data subset (e.g., a second partition of the data space). In response to obtaining the first data subset, control layer 114 determines a second location at which to split the first data subset in a second dimension of the plurality of dimensions. The control layer 114 determines the second location based at least in part on a middle point of the first data subset.

Data management service 110 uses control layer 114 to recursively split a data space corresponding to a dataset until pieces of data comprised in the resulting partitions can be clustered into a set of files that respectively satisfy a file constraint, such as an approximate target size. Control layer 114 splits the data space (e.g., an initial data space and a data space of a partition of the initial data space) along a plurality of dimensions. The dimensions along which the data space is split can correspond to a plurality of keys of the dataset. In some embodiments, control layer 114 iteratively/recursively splits the data space until the collective size of records comprised within the partitions of the data space satisfy a predefined criterion such as an approximate target size. After each split during the iterative/recursive splits, control layer 114 determines whether to further split the data space and/or a location at which the data space is to be (further) split. Determining the location at which the data space is to be split can include determining a dimension along which the data space (e.g., an initial data space and a data space of a partition of the initial data space) is to be split and/or a determining of a location or set of locations (in response to the split being 3 ways or by some other amount) of the data space at which the data space is to be split along such dimension. In some embodiments, control layer 114 determines the location at which the data space is to be split based at least in part on one or more pieces of data (e.g., records) within the data space. For example, control layer 114 can determine the location at which to split the data space based at least in part on split point(s) with respect to the pieces of data comprised in the data space being split.

According to various embodiments, control layer 114 determines the split point(s) with respect to the pieces of data (e.g., records) within the data space (e.g., an initial data space and a data space of a partition of the initial data space) based at least in part on a number of pieces of data and/or a size of the pieces of data (e.g., a size of each piece of data).

Control layer 114 can determine the split point(s) with respect to the pieces of data within a data space based on whether the pieces of data are the same size (e.g., within a threshold amount or threshold number of standard deviations of a particular record size). In some embodiments, for a 2-way split, if the pieces of data are the same size (or roughly the same size, such as based on a variation of the sizes of the pieces of data), then control layer 114 determines the location at which to the split the data space based at least in part on the median piece of data (e.g., a location of the median piece of data) in the corresponding data space. For example, control layer 114 uses a key value for the median piece of data as a boundary at which the data space is to be split. The use of the median piece of data splits the data space so that, in the case of an even number of pieces of data in the data space, each partition comprises half of the pieces of data. In the case of an odd number of pieces of data (e.g., 2n+1 pieces of data, where n is a positive integer) in the data space, the use of the median piece of data splits the data space so that a first partition comprises n records, and a second partition comprises n+1 records.

According to various embodiments, control layer 114 determines the split point(s) for an N-way split with respect to the pieces of data (e.g., records) within the data space (e.g., an initial data space and a data space of a partition of the initial data space) based at least in part on a number of pieces of data and/or a size of the pieces of data (e.g., a size of each piece of data).

Control layer 114 can determine the split point with respect to the pieces of data within a data space based on whether the pieces of data are the same size (e.g., within a threshold amount or threshold number of standard deviations of a particular record size). In some embodiments, if the pieces of data are the same size (or roughly the same size, such as based on a variation of the sizes of the pieces of data), then control layer 114 determines the location(s) at which to the split the data space in the corresponding data space to create N groups. For example, control layer 114 uses a key value for an edge piece of data as a boundary at which the data space is to be split. The use of the edge piece of data splits the data space so that, in the case of a number of pieces of data divisible by N in the data space, each partition comprises a split of the pieces of data into equal. In various embodiments, N is an integer other than one, N is a prime number other than 1, or N is any other appropriate integer value.

In response to determining that the pieces of data are not the same size (e.g., or roughly the same size such as based on whether the sizes are within a threshold amount or threshold number of standard deviations of a particular record size), control layer 114 uses weighted split point(s) as the location at which to split the corresponding data space. In some embodiments, the weighted split point(s) can use the center of mass or distribution of the pieces of data within the data space (e.g., a median, a quartile, a quintile, etc.). For example, the weighted split point(s) can be determined based at least in part on respective weightings for the pieces of data within the data space. As another example, the weighted split point(s) can be determined based on a summation of the sizes of the pieces of data within the data space and determining a piece of data comprising split point(s) of the aggregate size of the pieces of data.

According to various embodiments, in connection with recursively splitting the data space, control layer 114 can invoke a bias (e.g., a splitting preference) with respect to one or more particular dimensions along which the data space is split. In some embodiments, the bias is preset such as in a data management policy or based on a user/system configuration. In some embodiments, the bias is at least partly determined based on an expected file size and/or an approximate target size. For example, the system determines a number of splits along the various dimensions to cluster the set of data into the set of files in a manner that the set of files satisfy a file constraint such as an approximate target size. As examples, the splits as they are described in [0029]-[0031]. If control layer 114 were to implement a sequential splitting over the dimensions of the data space, the resulting clustering of data into the set of files may result in a skew, such as if the recursive splitting to obtain the partitions for the set of files did not complete a full cycle of splitting across the various dimensions that the data space is split.

In some embodiments, control layer 114 determines a bias (e.g., a splitting preference) with respect to a manner by which data in a dataset is to be clustered based on a data management policy or a user setting. The data management policy or user setting can be configured based on input from a user (e.g., an administrator such as based on an input communicated to data management service 110 by administrator system 130) or based on a request from another system (e.g., a third-party service 120 or other data source 150), such as a request sent by the other system to a storage system that requests the storage system to store the data comprised in the dataset. The bias can indicate a dimension of the dataset along which the dataset is preferentially split (e.g., split more than splitting performed in other directions). In some embodiments, in the case of the dataset comprising a plurality of dimensions along which the data is to be split, data management service 110 can use biases corresponding to one or more dimensions. For example, in the case of a splitting of a dataset along three dimensions, control layer 114 can determine to split the dataset in a first dimension four times more than the dataset is to be split in a third dimension, and control layer 114 can determine to split the dataset in a second dimension two times more than the dataset is to be split in the third dimension. An example of a splitting according to such a bias is: (i) splitting the dataset in the first dimension; (ii) splitting the dataset in the first dimension, (iii) splitting the dataset in the second dimension, (iv) splitting the dataset in the first dimension, (v) splitting the dataset in the first dimension, (vi) splitting the dataset in the second dimension, (vii) splitting the dataset in the third dimension, and (viii) splitting the dataset sequentially in the first, second, and third dimension and repeating this step until the various partitions of the dataset satisfy an approximate target size. This gives the first dimension four times better splitting than the third dimension and gives the second dimension two times better splitting than the third dimension.

In some embodiments, control layer 114 determines a bias with respect to a manner by which data in a dataset is to be clustered based at least in part on an expected file size, approximate target size, and/or a data management policy or a user setting. Control layer 114 can further determine a bias with respect to a manner by which the data space is to be split based on a predefined bias threshold (e.g., control layer 114 determines a sequence of splitting in order to obtain a clustering across the set of files that satisfies the bias threshold, etc.). For example, if control layer 114 determines the size of data and the expected file size (e.g., through simulation) before performing the recursive splitting, control layer 114 can determine the number of files into which the data is to be clustered. Control layer 114 can then determine whether to preferentially split the data in a particular dimension(s) over another dimension(s), such as in order to obtain the desired number of files. As an example, data management service 110 determines that a dataset comprises 100 GB of data that is to be clustered along three dimensions (e.g., three columns). If the approximate target size is 128 MB, then data management service 110 (e.g., control layer 114) determines that the data is to be clustered across (e.g., stored among) 800 files. As an example, if data management service 110 determines that by sequentially splitting the dataset along a set of dimensions equally would cause the system to perform a last split along a dimension that results in a particular dimension being split more than the other dimensions, then data will have a 2× bias with respect to the dimension along which the data was last split. For example, suppose there is 128 GB of data and 1 GB sized files are to be created. This means the data needs to be split into 128 partitions. Then 7 splittings ($2^7=128$) are required:

Round-1: Split by dimension-1
Round-2: Split by dimension-2
Round-3: Split by dimension-1
Round-4: Split by dimension-2
Round-5: Split by dimension-1
Round-6: Split by dimension-2
Round-7: Split by dimension-1

After round 7, there are 128 partitions in total but in doing that the splitting of dimension-1 happens one more time than dimension-2—So it has 2× greater bias—which is not desired. This bias can be identified by mathematical calculations (as above) OR by sampling very small percentage of the 128 GB data (say 0.01%) and then running the simulation on it to split by medians over each dimension at every step and then observing which dimension is split more at the end on the sample simulation. To control the bias, a different set of splits can be performed:

Round-1: Split two-way by dimension-1
Round-2: Split two-way by dimension-2
Round-3: Split two-way by dimension-1
Round-4: Split two-way by dimension-2
Round-5: Split three-way by dimension-1
Round-6: Split three-way by dimension-2

This gives: 2*2*2*2*3*3=144 partitions. So, there is a slight deviated from the target partitions, but the partitions are within a bias threshold.

In some embodiments, data management service 110 may determine that such a bias/skew is too great (e.g., exceed a bias threshold). In response to such a determination, the system determines a sequence of splitting that results in a bias less than (or less than or equal to) the (predefined) bias threshold. For example, if the bias threshold corresponds to a splitting in a first dimension that is 1.5× the splitting in a second dimension, data management service 110 may determine that splitting the data in the first dimension 3 ways for every two splits in the second dimension will result in the bias threshold being satisfied.

According to various embodiments, data management service 110 uses data layer 112 to store the data of the dataset across a set of files, such as based on the logical partitions determined by control layer 114 (e.g., boundary information determined by control layer 114), etc. As an example, control layer 114 can determine a mapping of records to files and provide such mapping to data layer 112.

In connection with storing the data across the set of files for dataset 119, data layer 112 stores metadata 117 associated with the files of the set of files. According to various embodiments, data layer 112 stores metadata 117 associated with files (e.g., each file) into which the data of dataset 119 is clustered. In some embodiments, metadata 117 comprises boundary information for the corresponding file. For example, the metadata comprises boundary information with respect to one or more keys of the data. In some embodiments, metadata 117 comprises a minimum value and a maximum value with respect to a key of the data for data comprised in a corresponding file. For example, for each key of the data, metadata 117 comprises a minimum value and a maximum value for the data comprised in the file. According to various embodiments, the boundary information for files corresponding to a dataset are non-overlapping (e.g., at least with respect to one key). In some embodiments, the boundary information for files corresponding to a dataset are non-overlapping with respect to all keys or dimensions along which the dataset is split. The non-overlapping of boundaries across files corresponding to a dataset facilitates a quick look-up for file(s) comprising particular data. For example, requests for data corresponding to a particular key value corresponding to a key (or range of key values) can be quickly processed to determine the files comprising such data. In some embodiments, there is an amount of data with the same combination of key values that is so large that it does not fit in a single file, and in this case, the system may decide to split the data up over multiple files using other distribution criteria (e.g., randomness, or other column values) so that the resulting files have the approximate target size—note that in this case, the multiple resulting files will have overlapping boundaries.

According to various embodiments, data management service 110 uses metadata 117 (e.g., the boundary information) for a set of files to determine a subset of one or more files for which the particular key value intersects. For example, data management service 110 uses metadata 117 to service data requests from a data requesting service (e.g., third-party service 120), client system 140, etc.

In response to receiving a data request, data management service 110 determines a subset of files that satisfy the data request, such as a subset of files in which data responsive to the data request is stored (if any). Data management (e.g., data layer 112) performs a look-up with respect to data corresponding to files associated with a dataset (e.g., a data space) in connection with determining a file that comprises particular data (e.g., a particular data item/record, or data satisfying one or more criteria with respect to a key/dimension such as data having a value with respect to a key less than a defined value, etc.). In some embodiments, data management service 110 receives a request for the particular data or for an indication of file(s) comprising the particular data. For example, data management service 110 receives from a user (e.g., client system 140) or other system (e.g., third-party service 120) a request comprising one or more criteria for data being requested (e.g., a data item/record having a particular value with respect to a key of the dataset). In response to determining that a look-up is to be performed to determine a file comprising particular data (e.g., in response to receiving the request for particular data), data management service 110 obtains metadata 117 for files corresponding to dataset 119. Data management service 110 determines the file(s) comprising the particular data based at least in part on metadata 117. For example, the system determines the file(s) comprising the particular data based at least in part on metadata 117 pertaining to the files of dataset 119 and one or more key values corresponding to the particular data. In some embodiments, data management service 110 uses boundary information comprised in metadata 117 in connection with determining file(s) comprising data that satisfies criteria associated with the data request (e.g., files for which the key value is within the corresponding boundaries of the files).

In response to determining a subset of files that may comprise data that is responsive to a data request, data management service 110 provides an indication of the subset of files or provides the subset of files. The indication of the subset of files includes one or more of (i) identifiers associated with the subset of files, and (ii) a location of the file. In some embodiments, in response to determining the file(s) comprising the particular data, data management service 110 provides to the requesting service or user from which the data request is received an indication of the file in which the particular data is comprised. In some embodiments, the providing the indication of the file(s) comprises communicating the file(s) to a user or system (e.g., client system 140 or third-party service 120) associated with the request for the particular data. In some embodiments, the providing the indication of the file(s) comprises providing a location at which the file(s) are accessible. The providing a location at which the file(s) are accessible can include generating a Uniform Resource Locator (URL) and providing the URL to the user or system (e.g., client system 140 or third-party service 120) associated with the request for the particular data. The URL may be configured to be signed with, or otherwise comprise, a credential with which the user or other system is to access the file(s).

In response to receiving new data (e.g., new records) for dataset 119, data management service 110 determines a manner for clustering such new data. In some embodiments, data management service 110 clusters the new data across the set of files over which the initial/previous data was clustered. For example, data management service 110 determines (e.g., for each piece of new data) a file within which to store the new data based at least in part on metadata 117 (e.g., a file having boundary box that encompasses the new data is identified and the new piece of data is stored in such file). In some embodiments, the new data is stored within new files that match the original clustering (i.e., the new data is stored in one or more files using the same partitioning as the original data). This has the advantage of not rewriting an entire file if it's not necessary—a second file is written next to the file. That also means that the decision to split data further may be taken based not on a single file that contains the data for one partition, but based on the combined sizes of the files that comprise one partition (e.g., if one partition was originally a single file of 128 MB, but now it has 5 files that add up to 256 MB, then it may be decided to further partition this data into two files of 128 MB each. Such a decision may also be delayed until a larger threshold is met—for example, the system could wait until it reaches 10 files, or until 512 MB in size is hit, before the data further partitioned. In some embodiments, partitions of the clustering are used instead of files, where one partition is represented by one or more files that are contained in the same bounding box.

In some embodiments, a file comprises a group of records, and that the group of records are stored in one physical file on a storage system. In some embodiments, the files may also be stored in multiple physical files on a storage system that together comprise the entire file. For example, in some cases it is desirable to decompose a file across multiple files in other ways (e.g., different columns go to different files).

In some embodiments, data management service 110 does not update the set of files based on the new data (e.g., data management service does not store new records into existing files). For example, data management service 110 deems the new data to be a new dataset, and data management service clusters the new data across another set of files, such as based on recursive splitting of the data space for the new dataset.

In some embodiments, in response to receiving a new record to store in connection with the dataset, data management service 110 writes the new record (e.g., each new record) to a corresponding file. For example, data management service 110 determines the file in which to store a new record based at least in part on a determination of a file having boundary information that would bound the key value(s) of the new record. Data management service 110 can use the key value(s) for the new record in connection with querying the metadata for the file having boundary information matching the key value(s) for the new record. Over time, the updating of files created during an initial clustering of data in a dataset to include new records can cause skew among the files if the new records are stored in single file or a small set of files (e.g., the new records may not be uniformly distributed across all files based on the key values for the new records).

According to various embodiments, data management service 110 (e.g., control layer 114) rebalances the pieces of data (e.g., records). For example, in response to determining that one file is relatively heavy (e.g., exceeds a predefined size threshold), data management service 110 determines to redistribute the data such as according to an optimal file size (e.g., the approximate target size). For example, suppose initially the data was divided into 128 MB files. With each file, the bias can be stored that it has (say 1.5× in first dimension, 1× in second dimension). When this file grows and becomes large—say 200 MB, and it exceeds the threshold, then this file needs to be divided into multiple parts. The bias information about this file and the "configured bias" from user can be used to decide which dimension should be chosen to split this file further. In the above example, if there is no user selected preferential bias, the bias should be kept as low as possible. In this case, the 200 MB file is then divided by a second dimension, and the effective bias will become 1× for first dimension and 2/1.5=1.33× for the second dimension.

In some embodiments, in response to determining that a particular file exceeds a predefined threshold size, data management service 110 further splits the particular file into sub-files. For example, control layer 114 determines a manner by which the particular is to be split (e.g., logical partitions of the corresponding data space), and data layer 112 stores the data in the particular file across the sub-files. In connection with determining the sub-files across which the data comprised in the particular file are to be clustered, data management service 110 can perform a splitting process similar to, or the same as, the recursive splitting of the initial dataset to a plurality of files. For example, data management service 110 determines a data space corresponding to the file that is relatively heavy, and data management service 110 recursively splits the data space corresponding to the file until a partition (e.g., each partition) comprises data that has an aggregated size less than a desired file size (e.g., the approximate target size), and then data management service 110 (e.g., data layer 112) stores the data for each of such partitions to the corresponding files (e.g., the sub files of the relatively heavy file).

In some embodiments, in response to determining that a particular file exceeds a predefined threshold size, data management service 110 obtains metadata 117 corresponding to the files for dataset 119, the system determines a data space for dataset 119 and re-performs the clustering of dataset 119 (including the new records that caused the unbalancing). As an example, data management service 110 reconstitutes the data space using the records comprised in the initial dataset and the records added after the initial clustering process was performed, and then data management service 110 performs the clustering process (e.g., recursively splits the data space until the system determines partitions (e.g., the expected file size as determined using simulation) that satisfy the approximate target size).

In some embodiments, newly received records are not stored in files into which the initial dataset was clustered. For example, data management service 110 does not rebalance dataset 119 or otherwise update the files across which the data for dataset 119 is clustered to include new records. Rather, the newly received records are used in connection with determining a new data space, and the data within such data space is clustered into a plurality of corresponding files. In such an implementation, it is possible that the files for the new data space have overlapping boundary information (e.g., bounding box) with respect to files for the initial data space. Accordingly, if the updated records are clustered according to such a process, in response to a request for particular data, data management service 110 queries the respective metadata 117 for the initial data space and the new data space to determine which file(s), if any, are expected to comprise data responsive to the request for data.

According to various embodiments, system 100 comprises an administrator system 130 for use by an administrator such as an administrator of data management service 110 or an administrator of a user associated with dataset 119 and/or an instance of data management service 110. For example, administrator system 130 comprises a system for communication, data access, computation, etc. An administrator uses administrator system 130 to maintain dataset 119 (e.g., maintain raw data comprised in a database), to define and manage applications provided by system 100, to set data management policies, to provide various system configurations or settings, etc. For example, an administrator uses administrator system 130 to define one or more security policies that are to be enforced (e.g., by data management service 110 and/or data layer 112) with respect to a data stored at dataset 119 (e.g., data exposed to data recipients via a data share). As another example, an administrator uses administrator system 130 to define a data management policy according to which dataset 119 is to be clustered into a set of files. In embodiments, administrator system 130 communicates with data management service 110 via a web-interface (e.g., by using a web browser, etc.), For example, administrator system 130 communicates with data management service 110 via a web-browser installed on administrator system 130 (e.g., via a user interface configured by an application running on data management service 110). In some embodiments, administrator system 130 communicates with data management service 110 via an application or service running on administrator system 130 (e.g., data sharing module 132 such as a connector or API corresponding to data management service 110). In some embodiments, an administrator of a dataset (e.g., dataset 119) can use administrator system 130 to configure the data management service 110 to set a bias preference, a file size preference (e.g., an approximate target size), and/or one or more thresholds associated with the clustering of data into a set of files.

According to various embodiments, business application layer 116 provides an interface via which a user (e.g., using client system 140, administrator system 130, etc.) may interact with various applications such as a development application for developing a feature or model for analyzing the data stored in the data source 150, an application for querying dataset 119, an application to access files stored in a dataset (e.g., a dataset stored in data source 150), an application to perform dataset cleanup such as compaction operations, etc. Various other applications can be provided by business application layer 116. For example, a user queries data layer 112 by sending a query/request to business application layer 116, which interfaces with data layer 105 to obtain information responsive to the query (e.g., business application layer 116 formats the query according to the applicable syntax and send the formatted query to data layer 112). As another example, an administrator uses an interface provided/configured by business application layer 116 to configure (e.g., define) one or more security policies including access permissions to files and/or one or more data management policies.

According to various embodiments, system 100 comprises client system 140. Client system 140 is used by a user such as a user corresponding to a data recipient (e.g., a developer such as a developer of code, a developer of a model, a user of an organization associated with a one or more datasets stored at dataset 119, etc.) to communicate with data management service 110 (e.g., a business application layer 116) and/or data stored in dataset 119. As an example, client system 140 communicates with data management service 110 via a web-interface. In some embodiments, client system 140 communicates with data management service 110 via an application or service running on client system 140 (e.g., a module such as a connector or API corresponding to data management service 110). In some embodiments, a user uses client system 140 to develop code on a business application layer, which makes a call to with respect to data exposed via data management service 110, or to invoke a task to be performed with respect to certain data stored in dataset 119 (e.g., to instruct data management service 110 to cluster the data, etc.), to modify code at a business application (e.g., to execute code against data stored in dataset 119), to query dataset 119 or a data share corresponding to a subset of data (e.g., data objects) within dataset 119 (e.g., in connection with discovering code, a library, a module, etc.), etc.

According to various embodiments, system 100 comprises one or more third-party services such as third-party service 120. Third-party service 120 is a data recipient (e.g., a data requesting service) that consumes data exposed via data shares of data comprised in dataset 119. Third-party service 120 can communicate data requests to data management service 110. Third-party service 120 can connect to (e.g., communicate with) data management service 110 via a module (e.g., a connector such as an API corresponding to data management service 110). Examples of the third-party service 120 include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other sharing clients.

Figure 2:
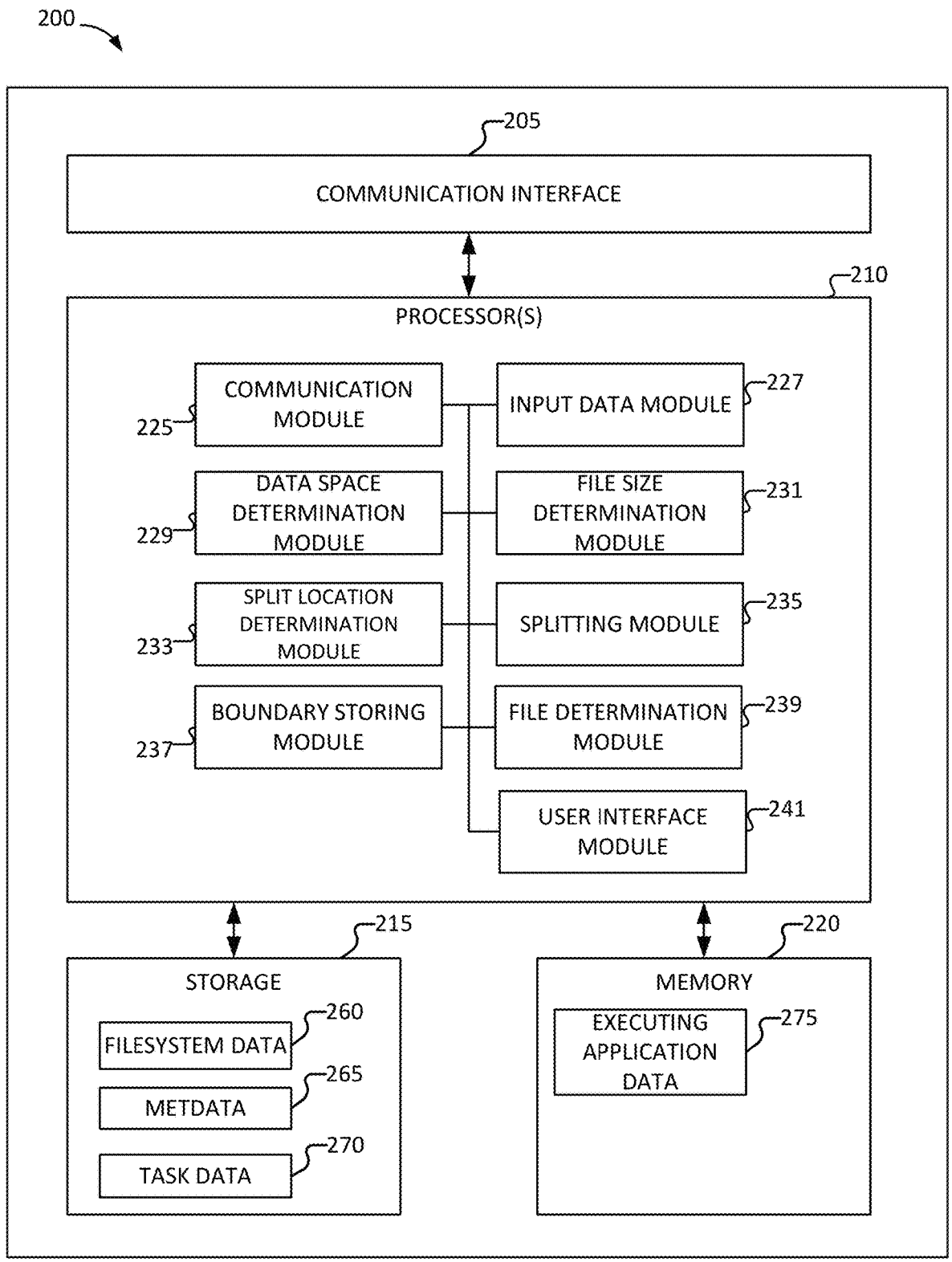
FIG. 2 is a block diagram of a data management service for clustering data into corresponding files according to various embodiments of the present application.

FIG. 2 is a block diagram of a data management service for clustering data into corresponding files according to various embodiments of the present application. According to various embodiments, system 100 implements at least part of system 100 of FIG. 1 (e.g., data management service 110), process 400 of FIG. 4, process 500 of FIG. 5, process 600 of FIG. 6, process 700 of FIG. 7A, process 750 of FIG. 7B, process 800 of FIG. 8A, process 820 of FIG. 8B, process 850 of FIG. 8C, and/or process 900 of FIG. 9.

In the example shown, system 200 implements one or more modules in connection with managing data, clustering a set of data into a set of files, and/or mediating access by data recipients with respect to the set of files. System 200 comprises communication interface 205, one or more processors 210, storage 215, and/or memory 220. One or more processors 210 comprises, or implements, one or more of communication module 225, input data module 227, data space determination module 229, file size determination module 231, split location determination module, splitting module 235, boundary storing module 237, file determination module 239, and/or user interface module 241.

In some embodiments, system 200 comprises communication module 225. System 200 uses communication module 225 to communicate with various other systems such as a user system, an administrator system, and/or a data source (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request a request to configure a data management service, a data management policy, a security policy, an access policy, a storage system configuration such as a configuration for a partitioning of data. The user input to the user system can include the creation of a new file, a modification or update to a file, a query for a file (e.g., a csv file, a library, a module, etc.), a request to set one or more security policies (e.g., a permission with respect to accessing a file or a directory), a request to set one or more data management policies, a request to set one or more data access permissions, etc. Communication module 225 is configured to provide various user systems or data requesting services with information such as user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates data responsive to data requests (e.g., queries to a dataset that has been clustered into a set of files, etc.).

In some embodiments, system 200 comprises input data module 227. System 200 uses input data module 227 to receive data to be stored in a dataset. For example, input data module 227 communicates with a client system, a data source, or third-party service to receive one or more pieces of data (e.g., records for a dataset) to be stored. In response to receiving the data to be stored, input data module 227 can provide the data to a service that manages storage of the data (e.g., that clusters the data into a set of files). In some embodiments, the data received by input data module 227 is used to update a set of files for which a dataset is clustered. In some embodiments, the data received by input data module 227 is used to form a new dataset for which a data management service clusters into a set of files.

In some embodiments, system 200 comprises data space determination module 229. System 200 uses data space determination module 229 to determine a data space for a dataset. For example, in response to receiving data to be stored in a dataset and/or determining to cluster the data into a set of files, system 200 determines a data space corresponding to the data/dataset. Determining the data space can include determining boundaries corresponding to the data, such as maximum and minimum values for a plurality of dimensions of the data (e.g., keys for the dataset) across the various pieces of data within the dataset.

In some embodiments, system 200 comprises file size determination module 231. System 200 uses file size determination module 231 to determine a file size for a set of files into which a set of data is to be clustered, and/or to determine a file size(s) for files into which new data (e.g., new records) are to be stored (e.g., such as in connection with determining whether to rebalance/split the files). In some embodiments, file size determination module 231 determines the file size for a set of files across which a set of data is to be clustered based at least in part on a data management policy. For example, the file size is determined based at least in part on a system setting or user preference. In some embodiments, the file size (e.g., the approximate target size) is determined based on empirical analysis of an optimal file size for retrieval of data (e.g., a file size that facilitates a quickest data retrieval or a data retrieval that is less than a threshold amount of time, etc.). The approximate target size can be used by system 200 in connection with determining how to split the data space for clustering the set of data across the set of files.

In some embodiments, system 200 comprises split location determination module 233. System 200 uses split location determination module 233 in connection with determining a manner by which a set of data is to be clustered across a set of files. For example, split location determination module 233 determines partitions of a data space corresponding to the set of data for which data (e.g., records) comprised in the respective partitions are to be stored in a corresponding file of the set of files. According to various embodiments, split location determination module 233 recursively splits the data space for the set of data until the partitions (e.g., each partition) satisfies the approximate target size. For example, split location determination module 233 iteratively determines logical splits to the data space(s) that would result in a set of partitions for which data respectively stored in the partitions can be stored in a file having a size less than or equal to the approximate target size.

According to various embodiments, split location determination module 233 determines a manner by which a data space (e.g., an initial data space and a data space of a partition of the initial data space) along a plurality of dimensions. The dimensions along which the data space is split can correspond to a plurality of keys of the dataset. Split location determination module 233 iteratively/recursively splits the data space until the collective size of records comprised within the partitions of the data space satisfy a predefined criterion such as an approximate target size. After each split during the iterative/recursive splits, split location determination module 233 determines whether to further split the data space and/or one or more locations (for multi-way splitting) at which the data space is to be (further) split. Determining the one or more locations at which the data space is to be split can include determining a dimension along which the data space (e.g., an initial data space and a data space of a partition of the initial data space) is to be split and/or a determining one or more locations of the data space at which the data space is to be split along such dimension. In some embodiments, the one or more locations at which the data space is to be split is determined based at least in part on one or more pieces of data (e.g., records) within the data space. In some embodiments, split location determination module 233 determines the location at which to split the data space based at least in part on a midpoint with respect to the pieces of data comprised in the data space being split. In some embodiments, split location determination module 233 determines the location at which to split the data space based at least in part on splitting the data into N parts, where N is an integer, with respect to the pieces of data comprised in the data space being split. In various embodiments, N is an integer other than one, N is a prime number other than 1, or N is any other appropriate integer value.

According to various embodiments, split location determination module 233 determines split point(s) of a data space based at least in part on whether the pieces of data are the same size (e.g., within a threshold amount or threshold number of standard deviations of a particular record size). In some embodiments, the pieces of data are assumed to be the same size. In some embodiments, system 200 determines respective sizes of the pieces of data and determines whether the pieces of data are the same size. In some embodiments, if the pieces of data are the same size (or roughly the same size, such as based on a variation of the sizes of the pieces of data), then split location determination module 233 determines the location at which to the split the data space based at least in part on the distribution of data (e.g., in a 2-way split a location of the median piece of data, such as a key value(s) for the median piece of data). For example, split location determination module 233 uses a key value for the median piece of data as a boundary at which the data space is to be split. The use of the median piece of data splits the data space so that, in the case of an even number of pieces of data in the data space, each partition comprises half of the pieces of data. In the case of an odd number of pieces of data (e.g., 2n+1 pieces of data, where n is a positive integer) in the data space, the use of the median piece of data splits the data space so that a first partition comprises n records, and a second partition comprises n+1 records. If the pieces of data are not roughly the same size, then splitting the data space at a location corresponding to a boundary of a partition comprising the median data piece can result in a skew among sizes of files obtained from the recursive splitting process.

According to various embodiments, if the pieces of data within a data space are not the same size (or roughly the same size), then split location determination module 233 determines a location at which to split the data space based at least in part on weighted split point(s) among the pieces of data of the data space. If the variance of the sizes of the pieces of data comprised within the data space exceeds a threshold variance (e.g., if the pieces are not all the same size), split location determination module 233 uses weighted split point(s) at which to split the data space. In some embodiments, the weighted split point(s) can use the center of mass or distribution of the pieces of data within the data space. For example, the weighted split point(s) can be determined based at least in part on respective weightings for the pieces of data within the data space. As another example, the weighted split point(s) can be determined based on a summation of the sizes of the pieces of data within the data space and determining a piece of data comprising split point(s) of the aggregate size of the pieces of data. As an illustrative example of such a determination of the weighted midpoint for a 2-way split case, suppose the data space comprises 7 pieces of data that have an aggregated size of 122 MB, the weighted midpoint corresponds to a location of a piece of data at which an aggregated size of a subset of pieces of data (e.g., the pieces of data being summed in an order based on a direction along a particular dimension of the data space) is 61 MB.

Split location determination module 233 can determine a manner by which to split the dataspace for a set of data based at least in part on a bias (e.g., a splitting preference) with respect to a manner by which data in a dataset is to be clustered based on a data management policy or a user setting. The bias can be predefined or determined by system 200 in order to more uniformly cluster the data across a set of files (e.g., to reduce a bias among dimensions). The data management policy or user setting can be configured based on input from a user (e.g., an administrator) or based on a request from another system (e.g., a third-party service that may be a data source), such as a request sent by the other system to a storage system that requests the storage system to store the data comprised in the dataset. The bias can indicate a dimension of the dataset along which the dataset is preferentially split (e.g., split more than splitting performed in other directions). In some embodiments, in the case of the dataset comprising a plurality of dimensions along which the data is to be split, split location determination module 233 uses biases corresponding to one or more dimensions. For example, in the case of a splitting of a dataset along three dimensions, split location determination module 233 can determine to split the dataset in a first dimension four times more than the dataset is to be split in a third dimension, and split location determination module 233 can determine to split the dataset in a second dimension two times more than the dataset is to be split in the third dimension. An example of a splitting according to such a bias is: (i) splitting the dataset in the first dimension; (ii) splitting the dataset in the first dimension, (iii) splitting the dataset in the second dimension, (iv) splitting the dataset in the first dimension, (v) splitting the dataset in the first dimension, (vi) splitting the dataset in the second dimension, (vii) splitting the dataset in the third dimension, and (viii) splitting the dataset sequentially in the first, second, and third dimension and repeating this step until the various partitions of the dataset satisfy an approximate target size.

Split location determination module 233 can iterate over (i)-(viii) until the various partitions of the dataset satisfy an approximate target size.

In some embodiments, system 200 comprises splitting module 235. System 200 uses splitting module 235 in connection with splitting the data space for the dataset based at least in part on the locations/dimensions determined by split location determination module 233. In some embodiments, splitting the data space comprises determining a set of one or more pieces of data (e.g., records) that are within partitions defined by the split locations/dimensions determined by split location determination module 233 and storing such set of one or more pieces of data in a file corresponding to the respective partition.

In some embodiments, system 200 comprises boundary storing module 237. System 200 uses boundary storing module 237 to store boundary information with respect to the partitions. For example, boundary storing module 237 stores boundary information for the set of files across which the dataset is clustered. In some embodiments, the boundary information is stored as metadata associated with the respective file(s).

System 200 (e.g., boundary storing module 237) stores metadata 265 associated with files (e.g., each file) into which the data of a dataset is clustered. In some embodiments, metadata 265 comprises boundary information for the file. For example, metadata 265 comprises boundary information with respect to one or more keys of the dataset. In some embodiments, metadata 265 comprises a minimum value and a maximum value with respect to a key of the data for data comprised in a corresponding file. For example, for each key of the dataset, metadata 265 comprises a minimum value and a maximum value for the data comprised in the file. According to various embodiments, the boundary information for files corresponding to a dataset are non-overlapping (e.g., at least with respect to one key of the dataset, for all keys, or for a subset of keys). In some embodiments, the boundary information for files corresponding to a dataset are non-overlapping with respect to all keys or dimensions along which the dataset is split. The non-overlapping of boundaries across files corresponding to a dataset facilitates a quick look-up for file(s) comprising particular data. For example, requests for data corresponding to a particular key value corresponding to a key (or range of key values) can be quickly processed to determine the files comprising such data. System 200 uses metadata 265 (e.g., the boundary information) for a set of files to determine a subset of one or more files for which the particular key value intersects such as in connection with determining a file to be accessed to retrieve/update certain data.

In some embodiments, system 200 comprises file determination module 239. System 200 uses file determination module 239 to determine a set of one or more files comprising data responsive to a data request. In response to receiving a data request, file determination module 239 performs a look-up with respect to metadata 265 (e.g., boundary information) for a set of files associated with a dataset being queried. File determination module 239 performs a look-up with respect to data corresponding to files associated with a dataset (e.g., a data space) in connection with determining a file that comprises particular data (e.g., a particular data item/record, or data satisfying one or more criteria with respect to a key/dimension such as data having a value with respect to a key less than a defined value, etc.). In response to determining that system 200 is to perform a look-up to determine a file comprising particular data (e.g., in response to receiving the data request for particular data), file determination module 239 obtains metadata 265 for files corresponding to the dataset (e.g., a dataset in which the particular data is comprised). File determination module 239 determines the file(s) comprising the particular data based at least in part on metadata 265. For example, file determination module 239 determines the file(s) comprising the particular data based at least in part on metadata 265 pertaining to the files of a dataset and one or more key values corresponding to the particular data. In some embodiments, file determination module 239 uses boundary information comprised in metadata 265 in connection with determining file(s) comprising data that satisfies criteria associated with the data request (e.g., files for which the key value is within the corresponding boundaries of the files).

System 200 can further use file determination module 239 to provide (e.g., via user interface module 241 and/or communication module 225) an indication of the file(s) comprising (or expected to comprise, if any) data that is responsive to a data request. In some embodiments, the providing the indication of the file(s) comprises communicating the file(s) to a user or system (e.g., a client system or a third-party service) associated with the request for the particular data. In some embodiments, the providing the indication of the file(s) comprises providing a location at which the file(s) are accessible. The providing a location at which the file(s) are accessible can include generating a Uniform Resource Locator (URL) and providing the URL to the user or system (e.g., a client system or a third-party service) associated with the request for the particular data. The URL may be configured to be signed with, or otherwise comprise, a credential with which the user or other system is to access the file(s).

In some embodiments, system 200 comprises user interface module 241. System 200 uses user interface module 241 to provide a user interface to a user (e.g., via a client system, etc.) via which the user configures/defines data shares, inputs data requests, configures data management policies, defines one or more thresholds such as a file size threshold, a bias threshold, etc., and configures/defines access permissions with respect to a dataset, etc.

According to various embodiments, storage 215 comprises one or more filesystem data 260, metadata 265, and/or task data 270. Storage 215 comprises a shared storage (e.g., a network storage system) and/or database data, and/or user activity data.

In some embodiments, filesystem data 260 comprises a database such as one or more datasets (e.g., one or more datasets for one or more features, models, schemas, tables, etc.).

In some embodiments, metadata 265 comprises information pertaining to data objects in a database (e.g., information pertaining to a set of files across which a dataset is clustered). Metadata 265 comprises information indicating the mapping/relationship of a particular dataset to a set of files across which data of the dataset is clustered. Metadata 265 includes information indicative of one or more predetermined partitions of a data space for a dataset. For example, metadata 265 comprises information pertaining to one or more dimensions of the data object (e.g., the file) along which the data space is partitioned (or to be partitioned). In some embodiments, metadata 265 comprises a minimum value and a maximum value with respect to a key of the data for data comprised in a corresponding file. For example, for each key of the data, metadata 265 comprises a minimum value and a maximum value for the data comprised in the file. According to various embodiments, the boundary information for files corresponding to a dataset are non-overlapping (e.g., at least with respect to one key).

In some embodiments, task data 270 comprises information pertaining to a clustering of a dataset across a plurality of files and/or a data request. For example, task data 270 comprises information indicating a set of dimensions along which a data space is split, a sequence of the dimensions used to recursively split the dataset, a location/boundary used in connection with performing the various splits during the recursive splitting process, etc. As another example, task data 270 comprises information indicating a system/user from which a data request is received, a filtering criteria/query associated with the data request, and/or a set of file(s) deemed to comprise data (if any) that is responsive to the data request, etc.

According to various embodiments, memory 220 comprises executing application data 275. Executing application data 275 comprises data obtained or used in connection with executing an application such as an application executing in connection with providing the access to datasets (e.g., data objects such as files that comprise data responsive to a data request), an application that enforces security of data in the storage system, an application that monitors data and operations of the data sharing or accessing of data shares, an application that executes code being developed in a workspace, etc. In some embodiments, executing application data 275 comprises data pertaining to URLs generated by system 200 in connection with providing access in response to data requests, or information pertaining to received data requests such as an indication of a dataset associated with the data request, an indication of associated files responsive to the data request, information pertaining to access permissions for the data requesting service associated with a data request, etc. In various embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3A:
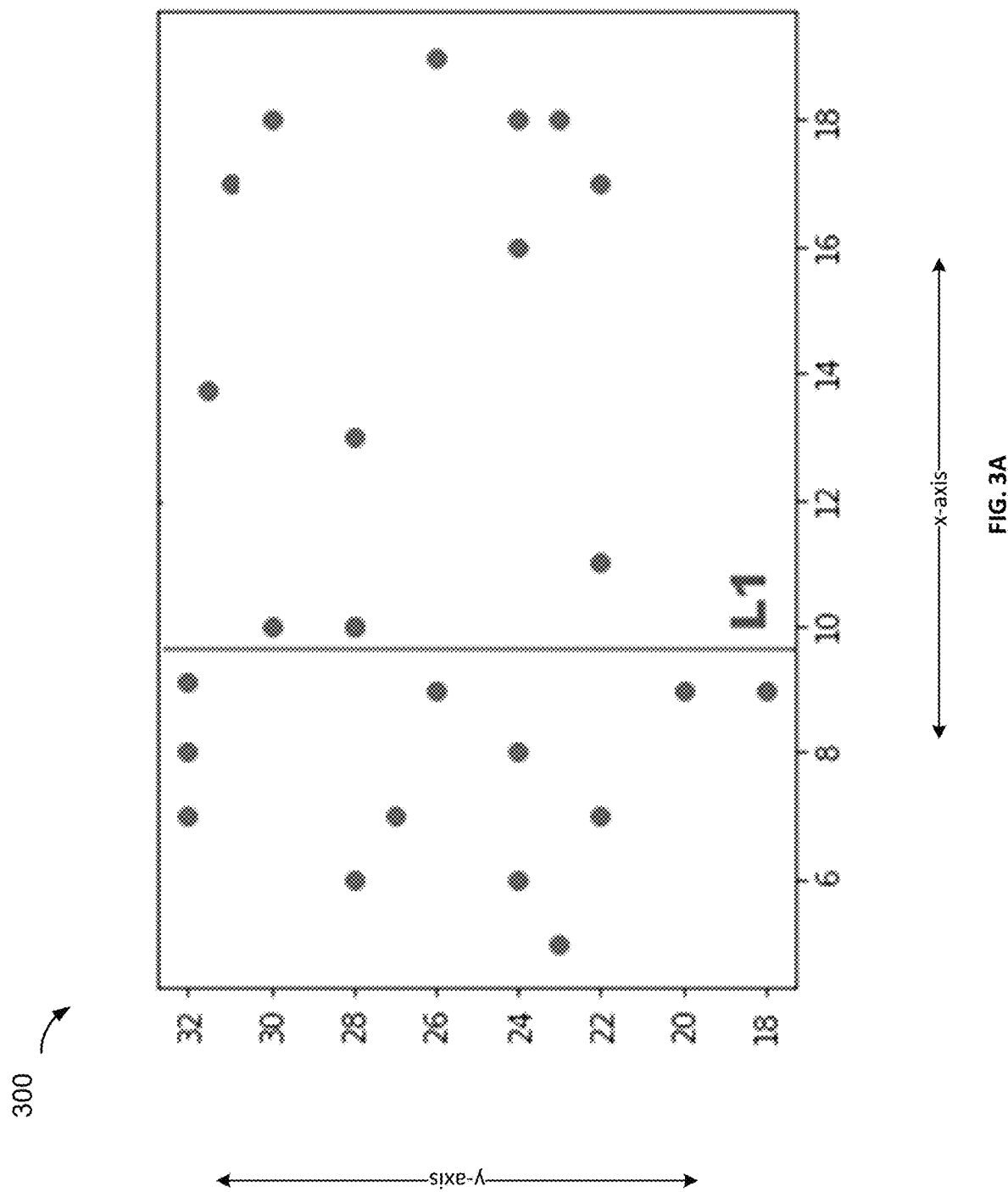
FIG. 3A is an illustration of 2-way splitting of a data space along a first dimension according to various embodiments of the present application.
Figure 3C:
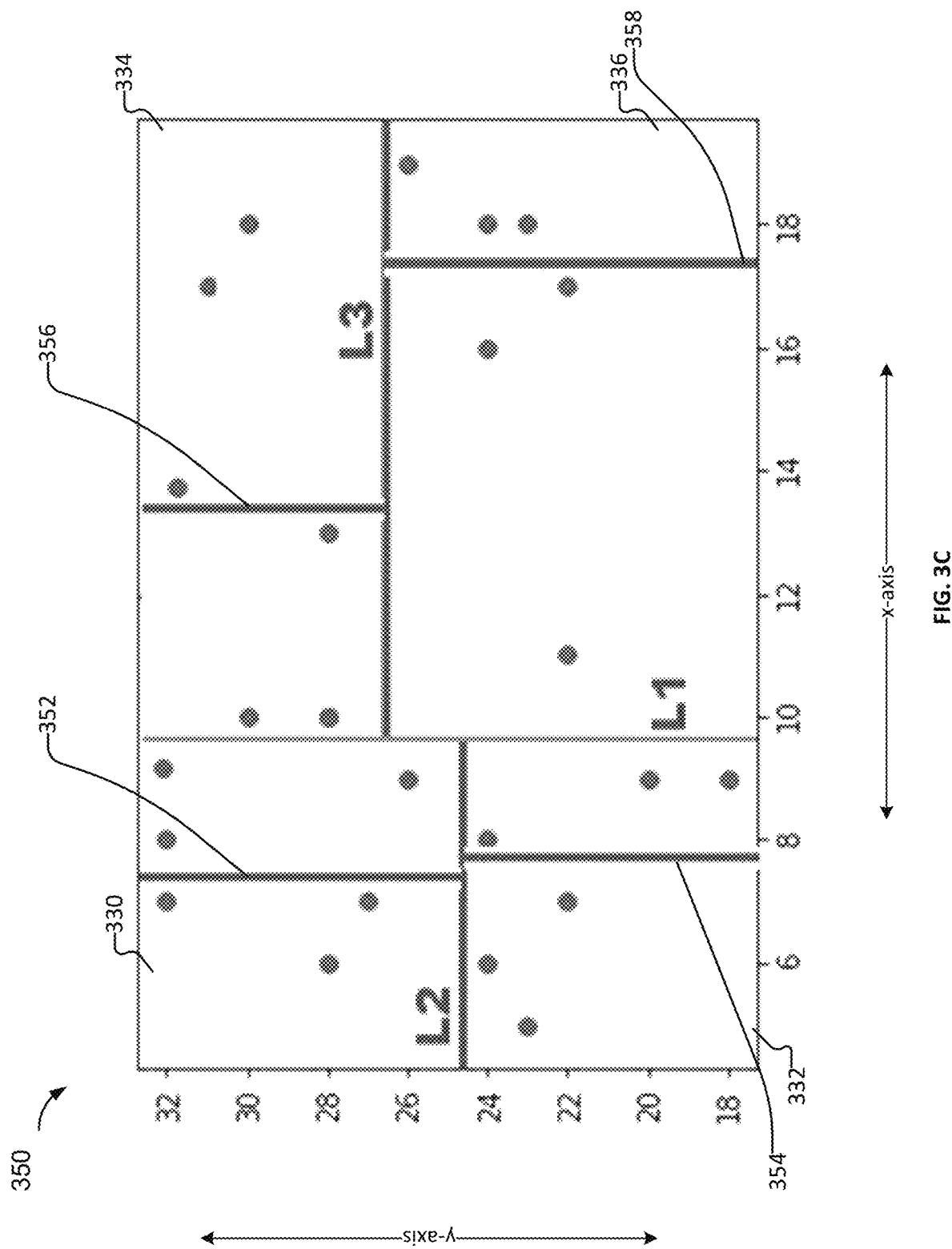
FIG. 3C is an illustration of 2-way splitting of a data space along a first dimension according to various embodiments of the present application.

FIGS. 3A-3C provide an illustration of 2-way splitting of a data space along 2 dimensions according to various embodiments of the present application. The splitting of the data space in accordance with splitting data space 300, data space(s) 325, and data space(s) 350 can be implemented at least in part by system 100 of FIG. 1 and/or system 200 of FIG. 2.

As illustrated in FIG. 3A, a data space comprises pieces of data distributed across the data space. In some embodiments, each piece of data corresponds to a record such as a record in a table (e.g., a row of a table). In the example shown, data space 300 is a two-dimensional space defined by an x-axis and a y-axis. The x-axis can correspond to values of a first key of the dataset, and the y-axis can correspond to values of a second key of the dataset. Accordingly, each record comprises a first key value for the first key and a second key value for the second key. In response to determining that a dataset is to be clustered, the system determines a data space corresponding to the dataset (e.g., a range of key value(s) for the various records of the dataset).

In some embodiments, the system determines a k-d tree associated with the clustering of data across the set of files (e.g., recursively splitting the data space(s)). The k-d tree is a binary tree in which every node is a k-dimensional point. Every non-leaf node corresponds to implicitly generating a splitting hyperplane that divides the data space (e.g., the initial data space, or the resulting data space(s) corresponding to the respective partitions) into two parts, known as half-spaces (e.g., the partitions). As an example, points to the left of this hyperplane are represented by the left subtree of that node and points to the right of the hyperplane are represented by the right subtree. The system attempts to recursively divide the data space (e.g., the data space corresponding to a particular node in the k-d tree) by each dimension (e.g., the x-axis and the y-axis in the current example).

As illustrated in FIG. 3A, data space 300 is split into two half spaces at location L1 (e.g., the data space is split in the y-axis dimension at x=L1). The system determines to split data space 300 at location L1 based on a determination that L1 corresponds to a midpoint of the data space. For example, to the left of the dividing line L1 (e.g., in the data space with records having an x-value of <L1) data space 300 comprises 12 data points (e.g., records), and to the left of the dividing line L1 (e.g., in the data space with records having an x-value >=L1), data space comprises 12 records. According to various embodiments, the midpoint corresponds to a median data record (e.g., a value of a record with respect to a particular key along which the data space is split). In some embodiments, L1 is determined to be the key value for the record in a half space having a highest key value for such key for which the data space is split (e.g., L1=maximum x value among records in the left half space. In some embodiments, L1 is determined to be the key value for the record in a half space having a lowest key value for such key for which the data space is split (e.g., L1=minimum x value among records in the right half space). In some embodiments, the system determines the midpoint (e.g., the value for L1) based on the maximum x value among records in the left half space and the minimum x value among records in the right half space. For example, the system can select the midpoint to be the average of the maximum x value among records in the left half space and minimum x value among records in the right half space. As another example, the system can select the midpoint to be such average further rounded to the nearest integer. The use of the midpoint as being the median record (e.g., a determination to split the data space so that both resulting half spaces have a same number of records) can be implemented when the records are the same size (or roughly the same size). However, if the records are not the same size (or roughly the same size), use of the median record as the midpoint can cause skew among the resulting set of files.

According to various embodiments, the system uses a weighted midpoint (e.g., a center of mass) of the data space in connection with determining a location at which to split the data space. For example, in response to determining that the records comprised in the data space are not the same size (or roughly the same size), the system determines a location at which to split the data space based at least in part on a weighted midpoint among the pieces of data of the data space. In some embodiments, if the variance of the sizes of the pieces of data comprised within the data space exceeds a threshold variance (e.g., if the pieces are not all the same size), the system uses a weighted midpoint as the midpoint at which to split the data space. In some embodiments, the weighted midpoint can correspond to a center of mass of the pieces of data within the data space. For example, the weighted midpoint can be determined based at least in part on respective weightings for the pieces of data within the data space. As another example, the weighted midpoint can be determined based on a summation of the sizes of the pieces of data within the data space and determining a piece of data comprising a midpoint of the aggregate size of the pieces of data. As an illustrative example in the context of data space 300, if the two left most records have a size that is 2× the size of all the other records in data space 300, then the aggregated weight of the left half space has a weight that is greater than the weight of the right half space (e.g., by a size of one of the two left most records). Using a weighted midpoint, the system can determine a center of mass of the records and select a midpoint based on such center of mass (e.g., using the example above, the center of mass would be located at a point where the right half space has 13 records and the left half space has 11 records because the difference in aggregated weights of the two half spaces is 2× the size of a record for all records other than the two-left most records).

As illustrated in FIG. 3B, data space(s) 325 correspond(s) to a next step in the recursive splitting of the initial data space. For example, as a next level of the k-d tree, the system determines to split the respective half spaces to form further partitions (e.g., half spaces of the half spaces). FIG. 3B illustrates the location at which the left half space is split is L2 (e.g., the left half space is split in the x-axis dimension at y=L2), and the location at which the right half space is split is (e.g., the left half space is split in the x-axis dimension at y=L3). According to various embodiments, the locations L2 and L3 are determined based at least in part on determining respective midpoints of the left half space and the right half space. In the example illustrated in FIG. 3B, the system determines the midpoint of the left half space as being the midpoint of records comprised in the left half space (e.g., such that the further half spaces 330 and 332 of the left half space each comprise 6 records), and the midpoint of the right half space as being the midpoint of records comprised in the right half space (e.g., such that the further half spaces 334 and 336 of the right half space each comprise 6 records). In such an example, the number of records in a half space is an even number. In the case of a half space comprising an odd number of records, the system determines the median record and splits the half space such that the median record is within one of the resulting partitions (e.g., such a partition has one more record than the other partition). In some embodiments, the system can determine the location at which to split the left half space and the right half space based on a weighted midpoint of the respective half spaces.

As illustrated in FIG. 3C, data space(s) 350 correspond(s) to a next step in the recursive splitting of the initial data space. For example, as a next level of the k-d tree, the system determines to split the respective partitions (e.g., the half spaces of the initially obtained half spaces) to form further partitions (e.g., half spaces of the half spaces). FIG. 3C illustrates the location at which the half space 330 is split is location 352 (e.g., the left half space is split in the y-axis dimension at x=location 352); the location at which the half space 332 is split is (e.g., the left half space is split in the x-axis dimension at y=location 354); the location at which the half space 334 is split is location 356 (e.g., the left half space is split in the y-axis dimension at x=location 356); and the location at which the half space 336 is split is (e.g., the left half space is split in the x-axis dimension at y=location 358). According to various embodiments, the locations 352, 354, 356, and 358 are determined based at least in part on determining respective midpoints of the half spaces such locations are used to split. In the example illustrated in Figure C, the system determines the midpoint of the half spaces 330, 332, 334, and 336 as being the midpoint of records comprised in the respective half spaces (e.g., such that the further half spaces each comprise 3 records). In such an example, the number of records in a half space is an even number. In the case of a half space comprising an odd number of records, the system determines the median record and splits the half space such that the median record is within one of the resulting partitions (e.g., such a partition has one more record than the other partition). In some embodiments, the system can determine the location at which to split the left half space and the right half space based on a weighted midpoint of the respective half spaces.

According to various embodiments, the system recursively splits the data space (e.g., the initial data space and the subsequently resulting half spaces) until a desired number of records are comprised within the respective partitions or the aggregated size of the records in the respective partitions satisfy a file size criterion (e.g., the expected file size as determined by simulating the aggregated size that is less than or equal to an approximate target size). In the example shown, if the desired number of records is 3 (or the desired aggregated size of the records in a partition corresponds to the cumulative weight of 3 records), then the system determines to end the recursive splitting. In response to determining to end the recursive splitting, the system stores the records for the various partitions into corresponding files. In some embodiments, all records within a particular partition (e.g., a hypercube) will be stored in the same file.

According to various embodiments, in cases when the last splitting iteration does not complete, the system splits with the earlier dimension more (e.g., the x-axis in the example described above) than what is done with the later ones (e.g., the y-axis in the example described above). In such cases, the system can split up splitting by dimension (e.g., column, key, etc.) 'x' 2 times whereas the system split the data space by dimension 'y' only once. Such a splitting may provide a better file skipping with respect to key 'x' as compared to key 'y'.

Figure 4:
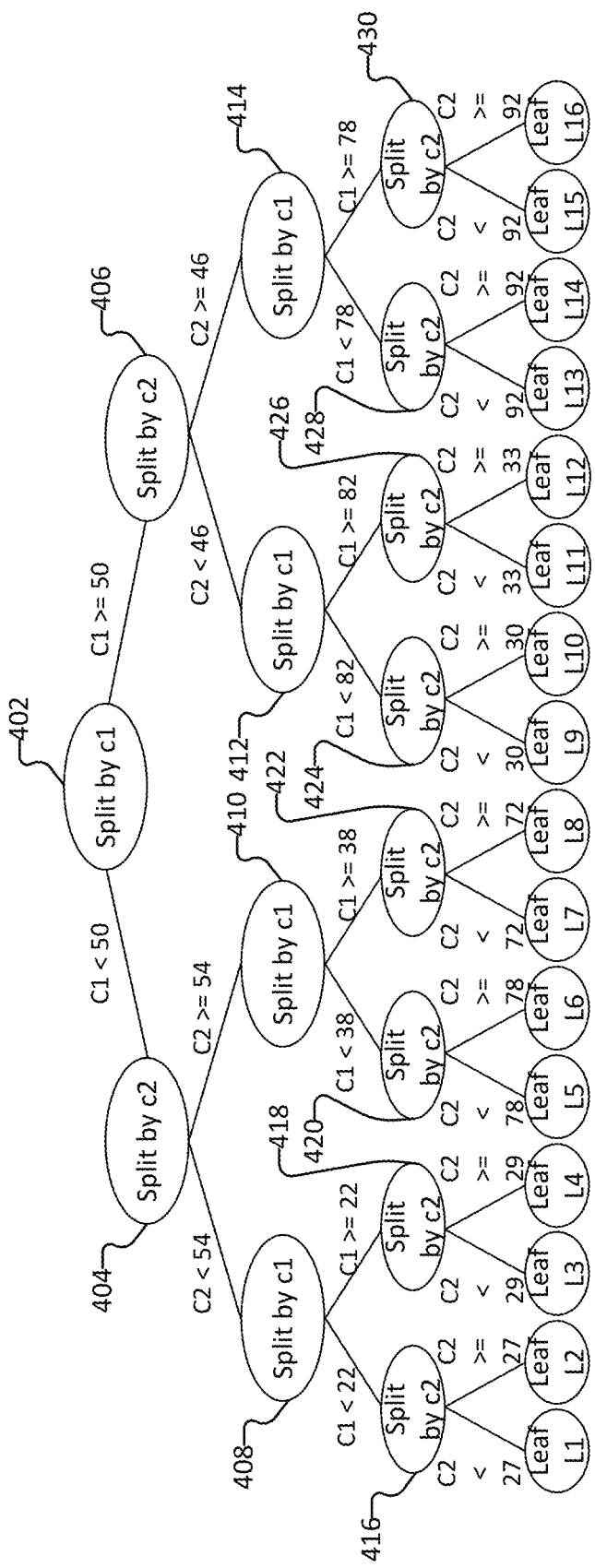
FIG. 4 is a diagram of a recursive splitting of a data space according to various embodiments of the present application.

FIG. 4 is a diagram of a recursive splitting of a data space according to various embodiments of the present application. The recursive splitting of the data space is illustrated as a k-d tree generated during process 400 for splitting the data space. The splitting of the data space is implemented at least in part by system 100 of FIG. 1 and/or system 200 of FIG. 2.

At node 402, the system determines to split the data space by C1. According to the example illustrated, the system determines the location at which to split the data space to be C1=51. For example, the system determines the midpoint of the data space as corresponding to a split location of C1=51. Accordingly, the system splits the data space to form two half spaces (e.g., corresponding to nodes 404 and 406). In the data space corresponding to node 404, the data space comprises all points (e.g., records) having a value in the C1 dimension of less than 50, and the data space corresponding to node 406 comprises all points having a value in the C1 dimension of equal to or greater than 50.

At node 404, the system determines to split the data space by C2 (e.g., a different dimension than what was used to split the initial data space). According to the example illustrated, the system determines the location at which to split the data space to be C2=54. For example, the system determines the midpoint of the data space as corresponding to a split location of C2=54. Accordingly, the system splits the data space to form two half spaces (e.g., corresponding to nodes 408 and 410). In the data space corresponding to node 408, the data space comprises all points (e.g., records) having a value in the C2 dimension of less than 54, and the data space corresponding to node 410 comprises all points having a value in the C2 dimension of equal to or greater than 54.

At node 406, the system determines to split the data space by C2 (e.g., a different dimension than what was used to split the initial data space). According to the example illustrated, the system determines the location at which to split the data space to be C2=46. For example, the system determines the midpoint of the data space as corresponding to a split location of C2=46. Accordingly, the system splits the data space to form two half spaces (e.g., corresponding to nodes 412 and 414). In the data space corresponding to node 412, the data space comprises all points (e.g., records) having a value in the C2 dimension of less than 46, and the data space corresponding to node 414 comprises all points having a value in the C2 dimension of equal to or greater than 46.

At node 408, the system determines to split the data space by C1 (e.g., the system is alternating splitting the data space in the C1 dimension and the C2 dimension). According to the example illustrated, the system determines the location at which to split the data space to be C1=22. For example, the system determines the midpoint of the data space as corresponding to a split location of C1=22. Accordingly, the system splits the data space to form two half spaces (e.g., corresponding to nodes 416 and 418). In the data space corresponding to node 416, the data space comprises all points (e.g., records) having a value in the C1 dimension of less than 22, and the data space corresponding to node 418 comprises all points having a value in the C1 dimension of equal to or greater than 22.

At node 410, the system determines to split the data space by C1 (e.g., the system is alternating splitting the data space in the C1 dimension and the C2 dimension). According to the example illustrated, the system determines the location at which to split the data space to be C1=38. For example, the system determines the midpoint of the data space as corresponding to a split location of C1=38. Accordingly, the system splits the data space to form two half spaces (e.g., corresponding to nodes 420 and 422). In the data space corresponding to node 420, the data space comprises all points (e.g., records) having a value in the C1 dimension of less than 38, and the data space corresponding to node 422 comprises all points having a value in the C1 dimension of equal to or greater than 38.

At node 412, the system determines to split the data space by C1 (e.g., the system is alternating splitting the data space in the C1 dimension and the C2 dimension). According to the example illustrated, the system determines the location at which to split the data space to be C1=82. For example, the system determines the midpoint of the data space as corresponding to a split location of C1=82. Accordingly, the system splits the data space to form two half spaces (e.g., corresponding to nodes 424 and 426). In the data space corresponding to node 424, the data space comprises all points (e.g., records) having a value in the C1 dimension of less than 82, and the data space corresponding to node 426 comprises all points having a value in the C1 dimension of equal to or greater than 82.

At node 414, the system determines to split the data space by C1 (e.g., the system is alternating splitting the data space in the C1 dimension and the C2 dimension). According to the example illustrated, the system determines the location at which to split the data space to be C1=78. For example, the system determines the midpoint of the data space as corresponding to a split location of C1=78. Accordingly, the system splits the data space to form two half spaces (e.g., corresponding to nodes 428 and 430). In the data space corresponding to node 428, the data space comprises all points (e.g., records) having a value in the C1 dimension of less than 78, and the data space corresponding to node 430 comprises all points having a value in the C1 dimension of equal to or greater than 78.

At nodes 416, 418, 420, 422, 424, 426, 428, and 430, the system determines to split the corresponding data spaces by C2. According to the example illustrated, the partitions (e.g., half spaces) obtained by splitting the data spaces at nodes 416, 418, 420, 422, 424, 426, 428, and 430 results in leaves L1, L2, L3, L4, L5, L6, L7, L8, L9, L10, L11, L12, L13, L14, L15, and L16. Leaves L1-L16 respectively correspond to partitions for which records comprised therein are to be stored in a corresponding file. For example, leaves L1-L16 corresponds to partitions for which the cumulative weight of the records comprised therein is less than or equal to the approximate target size.

According to various embodiments, the system simulates splitting according to different bias settings or in connection with determining a splitting process that results in a whole number of iterations of splitting across the applicable dimensions. For example, if less than a whole number of iterations of the splitting is performed, the resulting partitions (e.g., leaf nodes) may have a bias of splitting in a dimension(s) that were performed in the last less than whole iteration. In some embodiments, in connection with performing a penultimate iteration, the system determines whether the next iteration will be a complete/whole iteration. In some embodiments, in response to determining that the system determines that the last iteration will not be a complete/whole iteration, the system can adjust the iteration preceding the penultimate iteration so that the next iteration does not need to be performed in order to obtain partitions having desirable characteristics (e.g., a cumulative size of records that is less than or equal to the approximate target size).

According to various embodiments, at every level of the k-d tree, the system determines a number of iterations remaining (e.g., a total number of dimensions in an iteration—a number corresponding to a current dimension). In some embodiments, the system enforces a bounding condition that a remaining amount of data comprised in a partition being split is more than $2^{-n}$, where n=the number of iterations remaining and/or a bounding condition that the remaining data is less than $2^{\wedge}m$, where m=number of iterations remaining+total dimensions−1. In various embodiments, both bounding conditions described above are enforced by the system at each level of the k-d tree. Examples of enforcement of such bounding conditions is illustrated in Table 1 below, which includes a measure of how satisfactory a splitting process is based on a file size in relation to the approximate target size. In the table below, the size of the records is assumed to be the same. In Table 1 below, for columns 2-way splits and the solution enforcing bounding conditions, the commas delineate splits according to a particular dimension, and semi-colons delineate iterations.

TABLE 1

| # of Dimensions | Data amount (target file sizes) | 2-way splits (normal) | Solution enforcing bounding conditions | Splitting factor spread | File sizes (% of target size) |
|---|---|---|---|---|---|
| 2 | 6 | 2x, 2x; 2x | 3x, 2x | 1.5x | 100% |
| 2 | 7 | 2x, 2x; 2x | 3x, 3x | 1x | 78% (7/9) |
| 2 | 8 | 2x, 2x; 2x | 3x, 3x | 1x | 89% (8/9) |
| 2 | 8.1 | 2x, 2x; 2x, 2x | 2x, 2x; 2x; 2x | 1x | 51% (8.1/16) |
| 2 | 10 | 2x, 2x; 2x, 2x | 2x, 2x; 2x; 2x | 1x | 62% (10/16) |
| 3 | 9 | 2x, 2x, 2x; 2x | 3x, 2x, 2x | 1.5x | 75% (9/12) |
| 3 | 12 | 2x, 2x, 2x; 2x | 3x, 2x, 2x | 1.5x | 100% |
| 3 | 15 | 2x, 2x, 2x; 2x | 3x, 3x, 2x | 1.5x | 83% (15/18) |
| 3 | 17 | 2x, 2x, 2x; 2x, 2x | 3x, 3x, 2x | 1.5x | 94% (17/18) |
| 3 | 19 | 2x, 2x, 2x; 2x, 2x | 3x, 3x, 3x | 1x | 70% (19/27) |
| 3 | 24 | 2x, 2x, 2x; 2x, 2x | 3x, 3x, 3x | 1x | 89% (24/27) |
| 3 | 28 | 2x, 2x, 2x; 2x, 2x | 3x, 3x, 3x; 2x | 2x | 52% (28/54) |
| 4 | 17 | 2x, 2x, 2x, 2x; 2x | 3x, 2x, 2x; 2x | 1.5x | 71% (17/24) |
| 4 | 33 | 2x, 2x, 2x, 2x; 2x, 2x | 3x, 3x, 2x; 2x | 1.5x | 92% (33/36) |
| 4 | 37 | 2x, 2x, 2x, 2x; 2x, 2x | 3x, 3x, 3x; 2x | 1.5x | 69% (37/54) |
| 4 | 55 | 2x, 2x, 2x, 2x; 2x, 2x | 3x, 3x, 3x; 3x | 1x | 68% (55/81) |
| 4 | 82 | 2x, 2x, 2x, 2x; 2x, 2x, 2x | 3x, 3x, 3x, 3x; 2x | 2x | 51% (82/162) |
| 4 | 127 | 2x, 2x, 2x, 2x; 2x, 2x, 2x | 3x, 3x, 3x, 3x; 2x | 2x | 78% (127/162) |
| 5 | 81 | 2x, 2x, 2x, 2x, 2x; 2x, 2x | 3x, 3x, 3x, 2x, 2x | 1.5x | 75% (81/108) |
| 5 | 82 | 2x, 2x, 2x, 2x, 2x; 2x, 2x | 3x, 3x, 3x, 2x, 2x | 1.5x | 76% (82/108) |
| 5 | 127 | 2x, 2x, 2x, 2x, 2x; 2x, 2x | 3x, 3x, 3x, 3x, 2x | 1.5x | 78% (127/162) |
| 5 | 163 | 2x, 2x, 2x, 2x, 2x; 2x, 2x, 2x | 3x, 3x, 3x, 3x, 3x | 1x | 67% (163/243) |
| 5 | 244 | 2x, 2x, 2x, 2x, 2x; 2x, 2x, 2x | 3x, 3x, 3x, 3x, 3x; 2x | 2x | 50% (244/486) |

The system can simulate the splitting of the data space according to the various permutations and combinations of number of splits and order of splits for the defined dimensions. The system can select an optimal solution or a solution that satisfies an acceptance criterion such as having a ratio of resulting file size to target file size that exceeds a minimum threshold value and/or that is also below a maximum threshold value.

According to various embodiments, a variation to the splitting process described above in connection with Table 1 is described below in connection with Table 2. The variation of the splitting process is that for one or more particular According to various embodiments, the system selectively determines a number of splits to be made in an iteration based on an expected skew or imbalance between the different split portions of the set of files in which the dataset is clustered.

In Table 2 below, an underline denotes a change to the solution provided in table 1 for the row having the same number of dimensions and data amount. As seen in comparing Table 1 and Table 2, the splitting process improves the ratio of file size to approximate target size (e.g., the file size as a percentage relative to the target size).

TABLE 2

| # Dims | Data amount (target file sizes) | 2-way splits (normal) | Variation of splitting process | Splitting factor spread | File sizes (% of target size) |
|---|---|---|---|---|---|
| 3 | 28 | 2x, 2x, 2x; 2x, 2x | 2x, 3x, 3x; 2x | 1.33x | 78% (28/36) |
| 4 | 82 | 2x, 2x, 2x, 2x; 2x, 2x, 2x | 2x, 3x, 3x, 3x; 2x | 1.33x | 76% (82/108) |
| 4 | 127 | 2x, 2x, 2x, 2x; 2x, 2x, 2x | 2x, 2x, 3x, 3x; 2x, 2x | 1.33x | 83% (127/144) |
| 5 | 244 | 2x, 2x, 2x, 2x, 2x; 2x, 2x, 2x | 2x, 3x, 3x, 3x, 3x; 2x | 1.33x | 75% (244/324) | dimensions for which splits would be completed in a last iteration of the splitting process (e.g., when the last iteration is not a complete/whole iteration) the number of parts into which a dimension is split for such particular dimension(s) made in an earlier iteration (e.g., a first iteration or a penultimate iteration) is reduced (e.g., by one relative to the number of splits in the dimensions for which a split would not have been performed in the last iteration).

According to various embodiments, if the system determines that the last iteration would not be a complete/whole iteration, the system randomly selects the one or more dimensions (e.g., from among the set of dimensions along which the data space would be split in a complete iteration) over which to split the data space in the last (e.g., partial) iteration. In some embodiments, the random selection of the one or more dimensions over along which the data space is split in a last iteration is separately performed for each penultimate node in the k-d tree (e.g., so that each leaf in the k-d tree was obtained by its independently and randomly selected split dimension(s)).

In some embodiments, the system simulates the splitting according to a rule, the system determines whether the final split has file sizes (e.g., an average file size) smaller than an efficiency threshold, in response to being smaller than the efficiency threshold, change the rule and resimulate the splitting, and determine again whether the final split has file sizes smaller than the efficiency threshold. This repeats until the threshold is above the efficiency threshold. In various embodiments, the rules comprise a series of split sizes (e.g., into 2, into 3, etc.) and the dimension sequence (e.g., dimension 1, 2, 1, 3, 1, 2, 1, 3, etc.).

Figure 5:
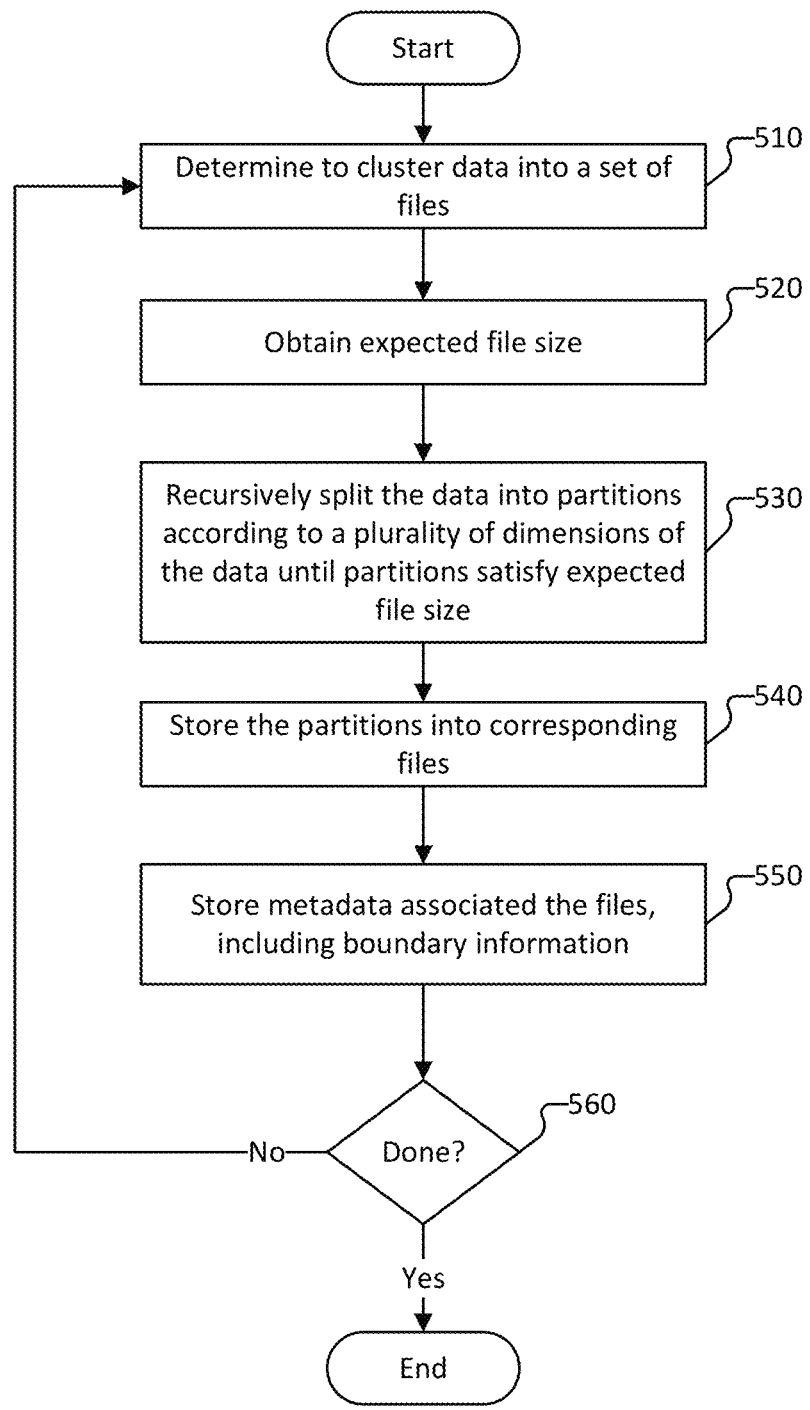
FIG. 5 is a flow diagram of a method for clustering data into corresponding files according to various embodiments of the present application.

FIG. 5 is a flow diagram of a method for clustering data into corresponding files according to various embodiments of the present application. According to various embodiments, process 500 is implemented at least in part by system 100 of FIG. 1 and/or system 200 of FIG. 2.

At 510, a determination is made to cluster data into a set of files. In some embodiments, the system determines to cluster the data into the set of files in response to a determination that a size of a dataset (e.g., a dataset to which a data source stores records) exceeds a predefined threshold size value. In some embodiments, the system determines to cluster the data into the set of files in response to a user input such as by an administrator of the data management service or an administrator of the dataset.

At 520, an expected file size is obtained. In some embodiments, the system obtains the approximate target size from a data management policy or a user configuration or user input.

At 530, the data is recursively partitioned according to a plurality of dimensions of the data until the partitions of data satisfy the approximate target size. In some embodiments, the system determines the dimensions over which the data is to be split (e.g., based on keys for the dataset), and the system varies the dimensions along which the data is split for each iteration. As an example, in the case of splitting the data in two dimensions, the recursively splitting the data includes alternating splitting the data along a first dimension and a second dimension until the resulting partitions have a data size that satisfies the approximate target size (e.g., the data size is less than or equal to the approximate target size). In some embodiments, the system determines the number of parts into which a given dimension is to be split (e.g., 2-way split, 3-way split, 4-way split, N-way split, where N is an integer larger than 1, etc.). In some embodiments, the number of parts into which a given dimension is to be split and the number of times a given dimension is split is determined using a simulation. In some embodiments, the simulation determines the goodness of breaking the data set into files of close to an approximate target size, where goodness measures how close the amount of data in the files is to an approximate target size. In some embodiments, the breaking of the data set into files is restricted to be achieve an amount of data in each file that is one or more of the following: greater than a target minimum file size, less than a target maximum file size, within a target percentage of a target maximum file size, and/or any other appropriate criteria or criterion.

At 540, the partitions of data are stored into corresponding files. In response to determining that the resulting partitions have a data size(s) that satisfies the approximate target size, the system stores the data comprised in each partition (e.g., the set of records within the partition boundaries) to a corresponding file. In some embodiments, each resulting partition (e.g., leaf node) corresponds to a single file.

At 550, metadata associated with the files is stored. In some embodiments, the metadata includes boundary information for the file. For example, the metadata comprises boundary information with respect to one or more keys of the data. In some embodiments, the metadata comprises a minimum value and a maximum value with respect to a key of the data for data comprised in a corresponding file. For example, for each key of the data, the metadata comprises a minimum value and a maximum value for the data comprised in the file. According to various embodiments, the boundary information for files corresponding to a dataset are non-overlapping (e.g., at least with respect to one key). In some embodiments, the boundary information for files corresponding to a dataset are non-overlapping with respect to all keys or dimensions along which the dataset is split.

According to various embodiments, in response to storing the metadata for the files, the system is able to forget the process by which the data was split, such as forget the k-d tree that was traversed to obtain the corresponding leaves. Related art systems generally maintain the tree structure and walk the tree in connection with determining a file to access in order to retrieve certain data. However, because the system stores metadata comprising boundary information for the set of files, the system is not required to walk (e.g., does not walk) the tree in connection determining a file to access for certain data. In some embodiments, the system affirmatively deletes the tree structure created during the clustering of the data into the set of files.

At 560, a determination is made as to whether process 500 is complete. In some embodiments, process 500 is determined to be complete in response to a determination that no further splits are to be made with respect to a data space, no further clustering of data into files is to be performed, the processing of clustering data into files is paused or stopped, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
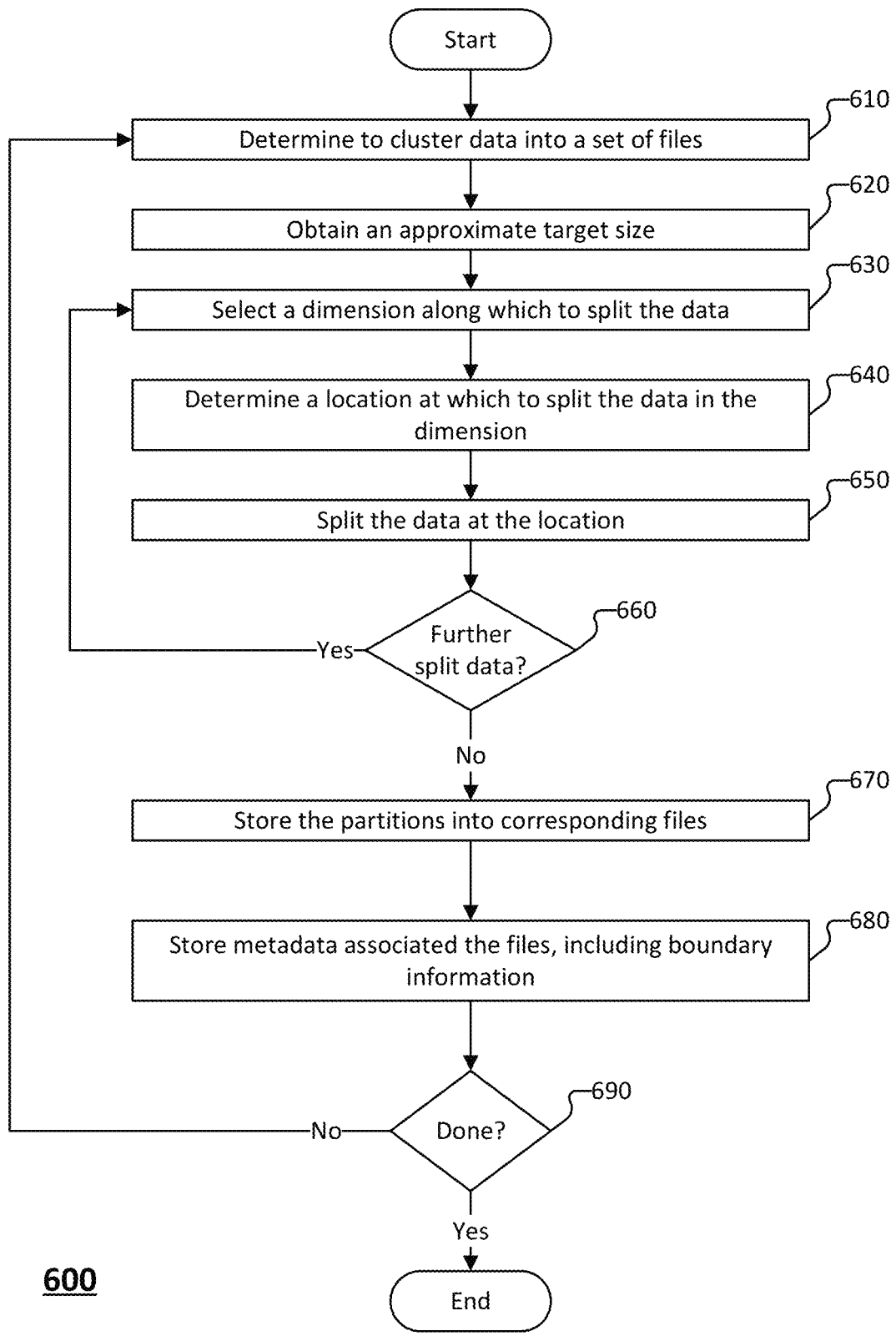
FIG. 6 is a flow diagram of a method for clustering data into corresponding files according to various embodiments of the present application.

FIG. 6 is a flow diagram of a method for clustering data into corresponding files according to various embodiments of the present application. According to various embodiments, process 600 is implemented at least in part by system 100 of FIG. 1 and/or system 200 of FIG. 2.

At 610, a determination is made to cluster data into a set of files. In some embodiments, the system determines to cluster the data into the set of files in response to a determination that a size of a dataset (e.g., a dataset to which a data source stores records) exceeds a predefined threshold size value. In some embodiments, the system determines to cluster the data into the set of files in response to a user input such as by an administrator of the data management service or an administrator of the dataset.

At 620, an approximate target size is obtained. In some embodiments, the system obtains the approximate target size from a data management policy or a user configuration or user input.

At 630, a dimension along which to split the data is selected. In some embodiments, the system determines the dimension along which to split the data from among a set of dimensions corresponding to keys of the data, or from a predefined set of dimensions. The system can determine the dimension along which to split the data based on a preceding dimension (if any) over which the data was split. For example, the system iterates over a sequence of dimensions along which to split the data. In some embodiments, the system can determine the dimension along which to split the data based on all preceding dimensions, including the number of times the data was split in each dimension, and into how many parts the data was split on each of these splits.

At 640, a location at which to split the data in the dimension is determined. For example, the system determines the number of parts to split the data in the given dimension and the locations for each split are determined. In some embodiments, the system determines the number of parts into which a given dimension is to be split (e.g., 2-way split, 3-way split, 4-way split, N-way split, where N is an integer larger than 1, etc.). In some embodiments, the number of parts into which a given dimension is to be split and the number of times a given dimension is split is determined using a simulation. In some embodiments, the simulation determines the goodness of breaking the data set into files of close to an approximate target size, where goodness measures how close the amount of data in the files is to an approximate target size. In some embodiments, the breaking of the data set into files is restricted to be achieve an amount of data in each file that is one or more of the following: greater than a target minimum file size, less than a target maximum file size, within a target percentage of a target maximum file size, and/or any other appropriate criteria or criterion. In the case of a 2-way split, the system determines a location to split the data—for example, a split point that is the midpoint of the data points along the given dimension. In the case of a 3-way split, the system determines two locations to split the data—for example, two split points that will separate the data points into three parts with approximately equal numbers of points along the given dimension. In the case of a 4-way split, the system determines three locations to split the data—for example, three split points that will separate the data points into four parts with approximately equal numbers of points along the given dimension. In the case of a N-way split, the system determines N−1 locations to split the data—for example, N−1 split points that will separate the data points into N parts with approximately equal numbers of points along the given dimension.

Various embodiments with a 2-way split determine the location at which to split the data space based at least in part on a midpoint with respect to the records comprised in the data space being split. In some embodiments, the system determines the midpoint based at least in part on whether the records are the same size (e.g., within a threshold amount or threshold number of standard deviations of a particular record size). In some embodiments, if the records are the same size (or roughly the same size, such as based on a variation of the sizes of the pieces of data), then the system determines the location at which to the split the data space based at least in part on the median record (e.g., a location of the median records). For example, the system uses a key value for the median record as a boundary at which the data space is to be split. The use of the median record splits the data space so that, in the case of an even number of pieces of data in the data space, each partition comprises half of the pieces of data. In the case of an odd number of pieces of data (e.g., 2n+1 pieces of data, where n is a positive integer) in the data space, the use of the median record splits the data space so that a first partition comprises n records, and a second partition comprises n+1 records. If the pieces of data are not roughly the same size (e.g., not within a threshold size variation, etc.), then splitting the data space at a location corresponding to a boundary of a partition comprising the median data piece can result in a skew among sizes of files obtained from the recursive splitting process.

In some embodiments, the system determines the location at which to split the data along the dimension based on a weighted midpoint of the data space being split. For example, the system determines a center of mass of the set of records comprised in the data space being split, and determines the location based on the determined center of mass.

At 650, the data is split at the location. The system performs a split of the data along the dimension at the location. In response to splitting the data at the location, the system obtains resulting partitions (e.g., two half spaces, three one-third spaces, four quarter spaces, five quintile spaces, etc.).

At 660, a determination is made as to whether to further split the data. In some embodiments, the system determines whether to further split the data based on a respective collective size of the records comprised in the resulting partitions. For example, the system compares the collective size of records comprised in a partition to an approximate target size. In response to determining that the collective size of records comprised in the partition exceed the approximate target size, the system determines to further split the data. In some embodiments, in response to determining that the collective size of records comprised in the partition is less than or equal to the approximate target size, the system determines to not further split the data.

In response to a determination that the data is to be further split at 660, process 600 returns to 630, and 630-660 are iterated until no further split is to be performed with respect to the data.

In response to determining that the data is to not be further split at 660, process 600 proceeds to 670 at which partitions are stored into corresponding files.

At 680, metadata associated with the files is stored. In some embodiments, the metadata includes boundary information. According to various embodiments, in connection with storing the metadata for the set of files, the system forgets/deletes a structure of the decision tree (e.g., the k-d tree) that was created to obtain the partitions.

At 690, a determination is made as to whether process 600 is complete. In some embodiments, process 600 is determined to be complete in response to a determination that no further splits are to be made with respect to a data space, no further clustering of data into files is to be performed, the processing of clustering data into files is paused or stopped, a user has exited the system, an administrator indicates that process 600 is to be paused or stopped, etc. In response to a determination that process 600 is complete, process 600 ends. In response to a determination that process 600 is not complete, process 600 returns to 610.

Figure 7A:
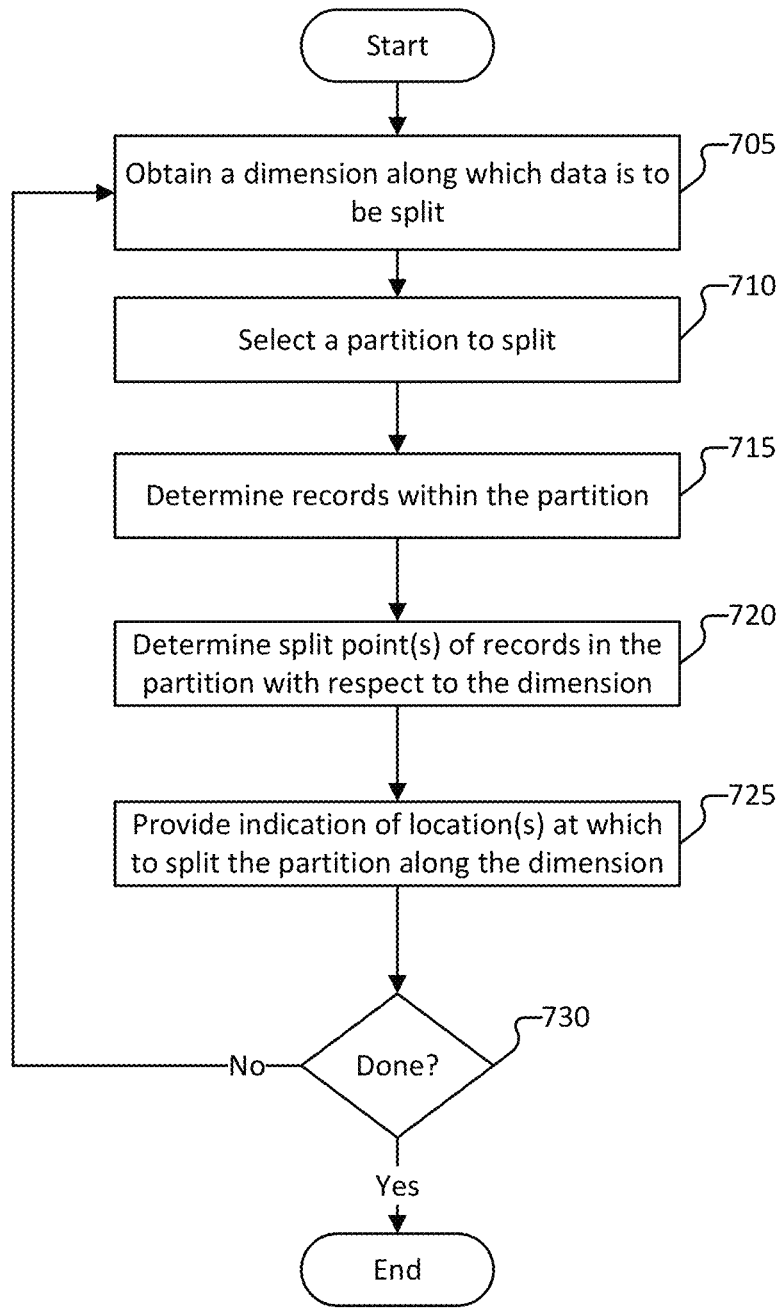
FIG. 7A is a flow diagram of a method for clustering data into corresponding files according to various embodiments of the present application.

FIG. 7A is a flow diagram of a method for clustering data into corresponding files according to various embodiments of the present application. According to various embodiments, process 700 is implemented at least in part by system 100 of FIG. 1 and/or system 200 of FIG. 2.

In some embodiments, process 700 is invoked by process 500 of FIG. 5, or 650 of process 600 of FIG. 6. Process 700 may be invoked in response to a determination that the records within the corresponding partition are the same size (or roughly the same size, such as within a threshold variation value).

At 705, a dimension along which data is to be split is obtained. In some embodiments, the system determines/selects the dimension along which to split the data. The dimension along which the data is to be split may be provided in connection with invocation of process 700.

At 710, a partition to split is determined. The system determines the data space that is to be split. The data space to be split may be provided in connection with invocation of process 700.

At 715, records within the partition are determined. In some embodiments system determines the records having key values that are bounded by the data space corresponding to the partition. In some embodiments, records within the partition are determined based on a sample of the data within the partition. The trick is to get enough samples before doing any partitioning—for example, 1) collect samples (e.g., 100 samples) for every <target size> MB of data in the original data set; 2) do the entire partitioning purely based on these samples; and 3) go back to the real dataset only when partitioning and writing the final files.

At 720, split point(s) of the records with respect to the dimension is/are determined. In response to determining the data space and the records within the data space, the system determines one or more split points of the records. For example, the system determines the number of parts to split the data in the given dimension and the split points or locations for each split are determined. In some embodiments, the system determines the number of parts into which a given dimension is to be split (e.g., 2-way split, 3-way split, 4-way split, N-way split, where N is an integer larger than 1, etc.). In some embodiments, N is one of the following integers: 2, 3, 5, 7, or any other prime integer. In some embodiments, the number of parts into which a given dimension is to be split and the number of times a given dimension is split is determined using a simulation. In some embodiments, the simulation determines the goodness of breaking the data set into files of close to an approximate target size, where goodness measures how close the amount of data in the files is to an approximate target size. In some embodiments, the breaking of the data set into files is restricted to be achieve an amount of data in each file that is one or more of the following: greater than a target minimum file size, less than a target maximum file size, within a target percentage of a target maximum file size, and/or any other appropriate criteria or criterion. In the case of a 2-way split, the system determines a location to split the data—for example, a split point that is the midpoint of the data points along the given dimension. In the case of a 3-way split, the system determines two the split points or locations to split the data—for example, two split points that will separate the data points into three parts with approximately equal numbers of points along the given dimension. In the case of a 4-way split, the system determines three the split points or locations to split the data—for example, three split points that will separate the data points into four parts with approximately equal numbers of points along the given dimension. In the case of a N-way split, the system determines N-1 the split points or locations to split the data—for example, N-1 split points that will separate the data points into N parts with approximately equal numbers of points along the given dimension. In various embodiments, N is an integer other than one, N is a prime number other than 1, or N is any other appropriate integer value.

At 725, an indication of location(s) at which to split the partition along the dimension is provided. In response to determining the split point(s) of the records, the system determines the location(s) at which to split the partition. For example, the location(s) at which to split the partition is/are determined based at least in part on the split point(s) of the records. The indication of the location(s) at which the partition is to be split can be provided to a system, process, or service that invoked process 700.

At 730, a determination is made as to whether process 700 is complete. In some embodiments, process 700 is determined to be complete in response to a determination that no further splits are to be made with respect to a data space, no further clustering of data into files is to be performed, the processing of clustering data into files is paused or stopped, a user has exited the system, an administrator indicates that process 700 is to be paused or stopped, etc. In response to a determination that process 700 is complete, process 700 ends. In response to a determination that process 700 is not complete, process 700 returns to 705.

Figure 7B:
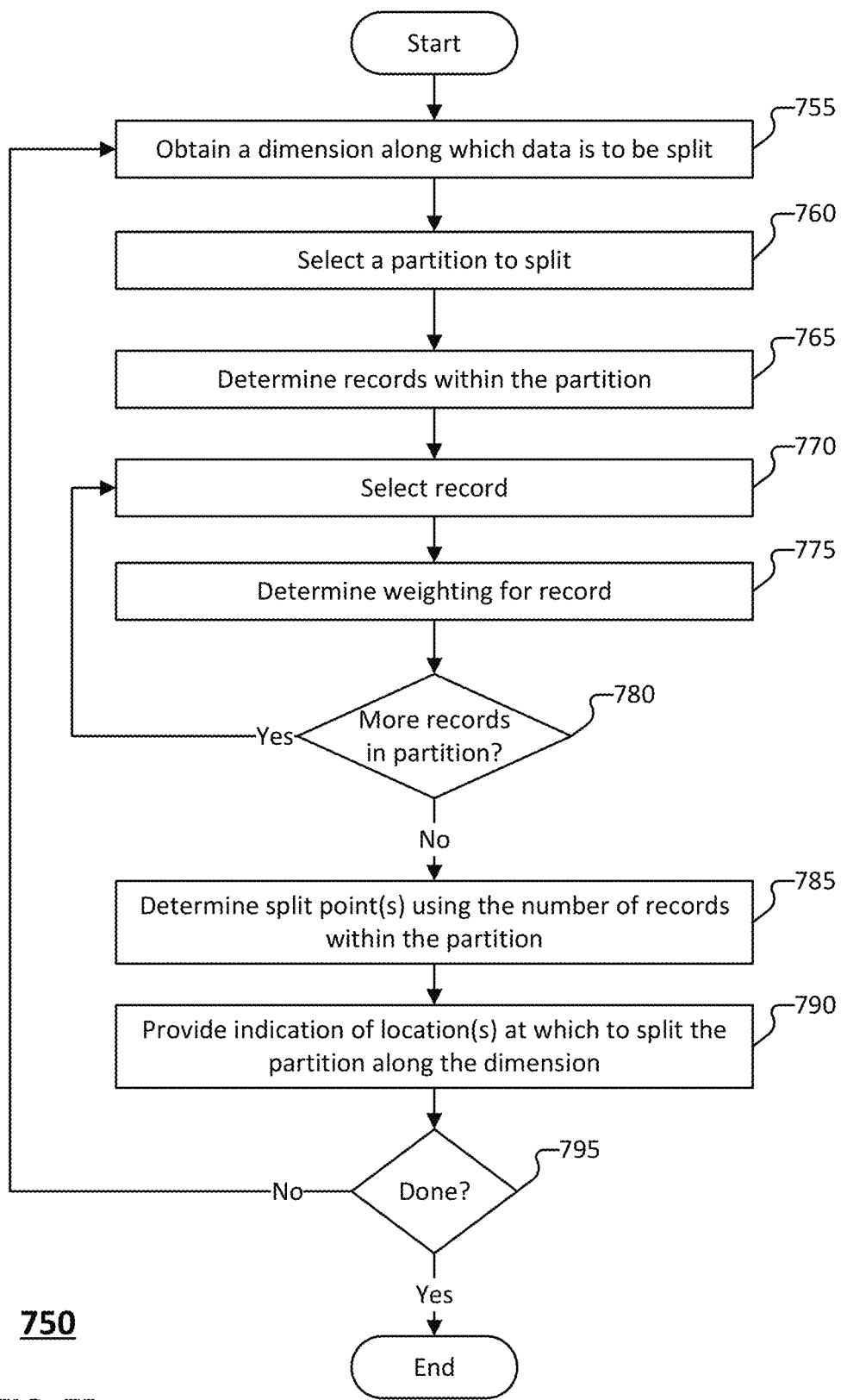
FIG. 7B is a flow diagram of a method for clustering data into corresponding files according to various embodiments of the present application.

FIG. 7B is a flow diagram of a method for clustering data into corresponding files according to various embodiments of the present application. According to various embodiments, process 750 is implemented at least in part by system 100 of FIG. 1 and/or system 200 of FIG. 2.

In some embodiments, process 750 is invoked by process 500 of FIG. 5, or 650 of process 600 of FIG. 6. Process 750 may be invoked in response to a determination that the records within the corresponding partition are not the same size (or that a difference or variation in the record size exceeds a threshold variation value).

At 755, a dimension along which data is to be split is obtained. In some embodiments, the system determines/selects the dimension along which to split the data. The dimension along which the data is to be split may be provided in connection with invocation of process 750.

At 760, a partition to split is determined. The data space to be split may be provided in connection with invocation of process 700.

At 765, records within the partition are determined. In some embodiments, the system determines the records having key values that are bounded by the data space corresponding to the partition.

At 770, a record is selected. The system selects a record from among the records comprised in the data space (e.g., the partition) to be split.

At 775, a weighting is determined for the selected record. In connection with determining a weighted midpoint or center of mass of the partition or split locations, the system determines weightings for the corresponding records. In some embodiments, the determining the weighting of the selected record corresponds to, or includes, determining a size (e.g., a data size or number of points in the record) of the record.

At 780, a determination is made as to whether more records for which weightings are to be determined exist in the partition.

In response to determining at 780 that more records exist for which weightings are to be determined, process 700 returns to 770 and process 700 iterates over 770-780 until no further records exist in the partition for which weightings are to be determined.

In response to determining at 780 that no more records exist for which weightings are to be determined, process 700 proceeds to 785 at which one or more split points is/are determined using the number of records within the partition.

At 790, an indication of the location(s) at which to split the partition along the dimension is provided. In response to determining the split point(s) of the records, the system determines the location(s) at which to split the partition. For example, the location(s) at which to split the partition is determined based at least in part on the split point(s) of the records. The indication of the location(s) at which the partition is to be split can be provided to a system, process, or service that invoked process 750.

At 795, a determination is made as to whether process 750 is complete. In some embodiments, process 750 is determined to be complete in response to a determination that no further splits are to be made with respect to a data space, no further clustering of data into files is to be performed, the processing of clustering data into files is paused or stopped, a user has exited the system, an administrator indicates that process 750 is to be paused or stopped, etc. In response to a determination that process 750 is complete, process 750 ends. In response to a determination that process 750 is not complete, process 750 returns to 755.

Figure 8A:
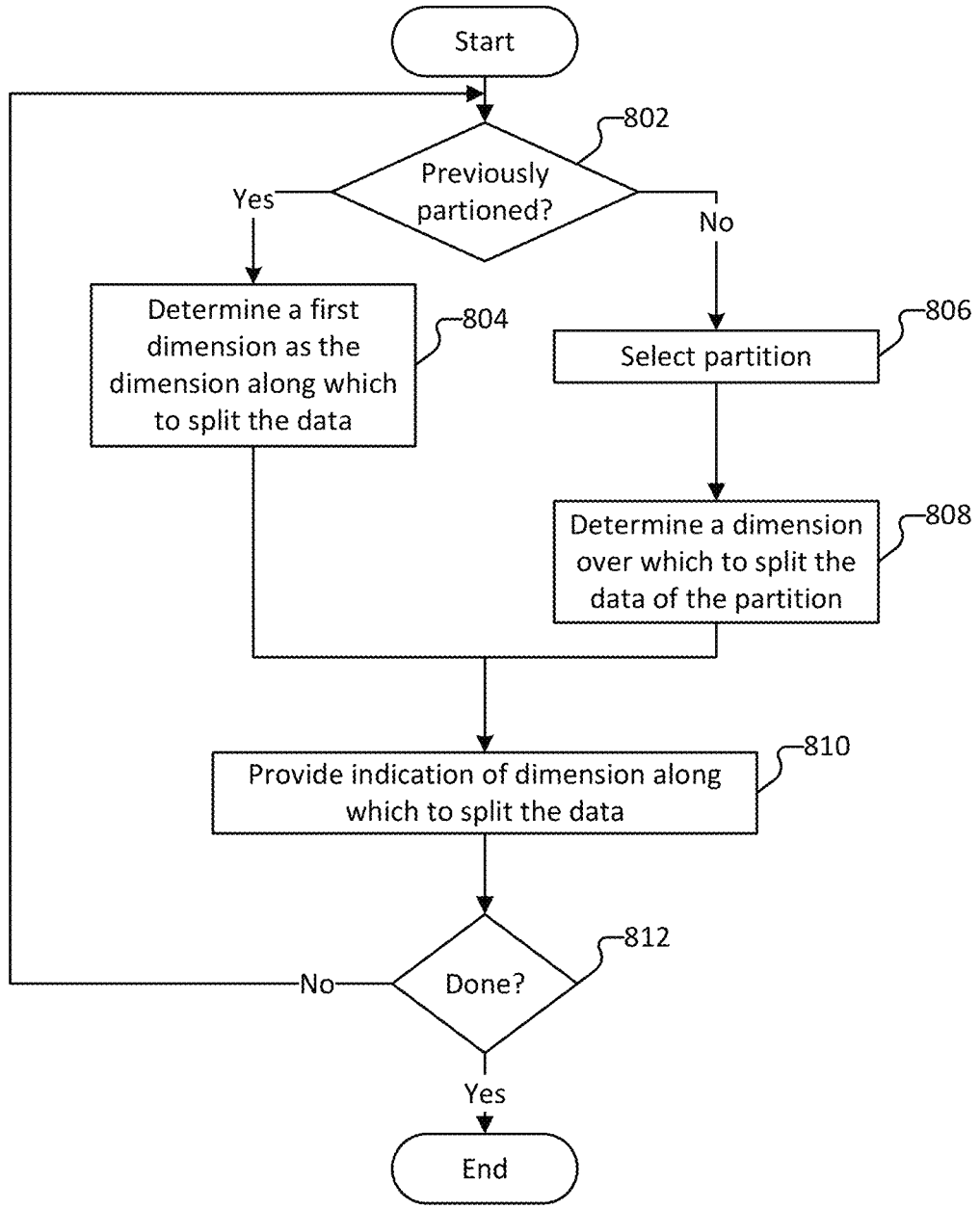
FIG. 8A is a flow diagram of a method for determining a dimension along which to split a data space according to various embodiments of the present application.

FIG. 8A is a flow diagram of a method for determining a dimension along which to split a data space according to various embodiments of the present application. According to various embodiments, process 800 is implemented at least in part by system 100 of FIG. 1 and/or system 200 of FIG. 2.

In some embodiments, process 800 is invoked by process 500 of FIG. 5, or 630 of process 600 of FIG. 6. Process 700 may be invoked in response to determining that a data space is to be split and in connection with the recursive splitting of the data space to obtain partitions (e.g., leaves) that satisfy an approximate target size.

At 802, a determination is made as to whether a data space has been previously partitioned. The system determines whether the data space has been previously partitioned because the system determines whether the data space splitting for which the dimension is being determined is an initial split of the data space. For example, the determination of the dimension along which to split the data is based at least in part on a preceding dimension (if any) over which the data was split. For example, the system iterates over a sequence of dimensions along which to split the data. In some embodiments, the determination of the dimension along which to split the data is based at least in part on the complete sequence of dimensions over which the data was split and the number of parts that the dimension was split at during each of the splits.

In response to determining that the data space has been previously partitioned at 802, process 800 proceeds to 804 at which a first dimension is determined to be the dimension along which the data is to be split. The first dimension can be predefined or otherwise determined on a desired bias of the delineation of files with respect to a particular key(s). Thereafter, process 800 proceeds to 810.

Conversely, in response to determining that the data space has not been previously partitioned at 802, process 800 proceeds to 806 at which a partition to split is selected. For example, if the data space has been previously partitioned, then the system selects a half space of the previously split data space for which a dimension is to be determined in connection with a forthcoming split.

At 808, a dimension over which to split the data of the partition is determined. Thereafter, process 800 proceeds to 810.

At 810, an indication of the dimension along which to split the data is provided. In some embodiments, in response to determining the dimension along which the data space is to be split, the system provides an indication of the dimension along which a split is to be performed. For example, the system provides the indication of the dimension to a system, process, or service that invoked process 800.

At 812, a determination is made as to whether process 800 is complete. In some embodiments, process 800 is determined to be complete in response to a determination that no further splits are to be made with respect to a data space, no further clustering of data into files is to be performed, the processing of clustering data into files is paused or stopped, a user has exited the system, an administrator indicates that process 800 is to be paused or stopped, etc. In response to a determination that process 800 is complete, process 800 ends. In response to a determination that process 800 is not complete, process 800 returns to 802.

Figure 8B:
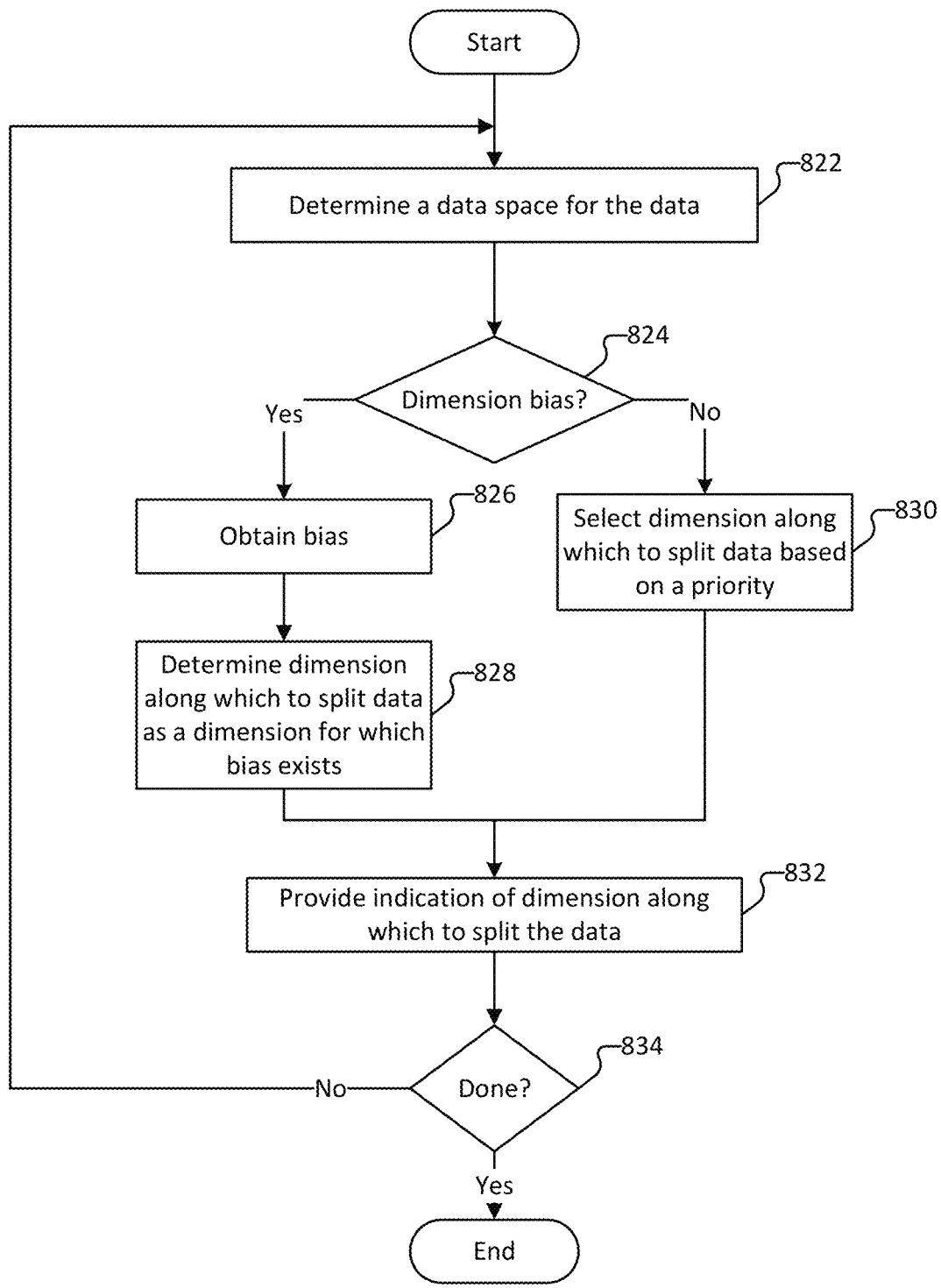
FIG. 8B is a flow diagram of a method for determining a dimension along which to split a data space according to various embodiments of the present application.

FIG. 8B is a flow diagram of a method for determining a dimension along which to split a data space according to various embodiments of the present application.

In some embodiments, process 820 is invoked by 804 of process 800.

At 822, the data space for the data is determined. In some embodiments, the system determines the boundary information for the dataset. For example, the system determines the maximum and minimum values for the various key values with respect to the records comprised in the data space.

At 824, a determination is made as to whether a dimension bias is to be enforced. For example, the system determines whether a data management policy or user input/request indicates whether to enforce a bias for splitting the data space along a preferred dimension(s).

In response to determining that a dimension bias is to be enforced at 824, process 820 proceeds to 826 which the bias is obtained. For example, the system determines the preferred dimension(s) for which a splitting of the data is to be biased. As an example, the preferred dimension(s) are obtained from a data management policy, etc.

At 828, the dimension along which to split the data is determined based on the bias. For example, the system determines that the dimension along which the data is to be split corresponds to the dimension for which the bias exists (or a dimension selected from the dimensions for which bias exists).

In response to determining that a dimension bias is not to be enforced at 824, process 825 proceeds to 830 at which the dimension along which the data space is to be split is determined based on a priority. For example, the system determines a skew preference/priority for a desired (or acceptable) skew of files relative to a key used to delineate the set of files. As another example, the system randomly selects the dimension (e.g., from a set of dimensions to be used to split the data space).

At 832, an indication of the dimension along which to split the data is provided. In some embodiments, in response to determining the dimension along which the data space is to be split, the system provides an indication of the dimension along which a split is to be performed. For example, the system provides the indication of the dimension to a system, process, or service that invoked process 850.

At 834, a determination is made as to whether process 820 is complete. In some embodiments, process 820 is determined to be complete in response to a determination that no further splits are to be made with respect to a data space, no further clustering of data into files is to be performed, the processing of clustering data into files is paused or stopped, a user has exited the system, an administrator indicates that process 820 is to be paused or stopped, etc. In response to a determination that process 820 is complete, process 820 ends. In response to a determination that process 820 is not complete, process 820 returns to 822.

Figure 8C:
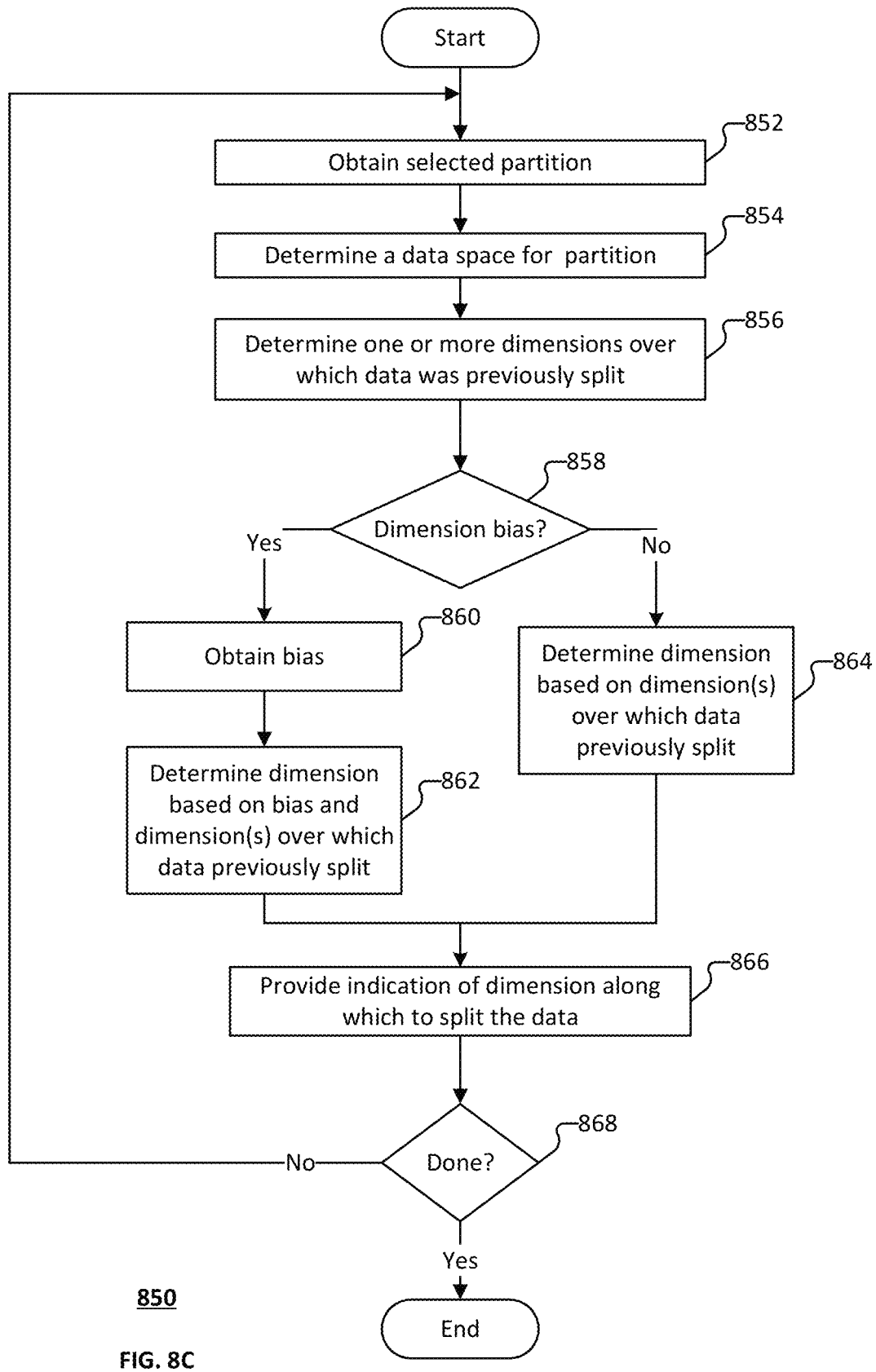
FIG. 8C is a flow diagram of a method for determining a dimension along which to split a data space according to various embodiments of the present application.

FIG. 8C is a flow diagram of a method for determining a dimension along which to split a data space according to various embodiments of the present application.

In some embodiments, process 850 is invoked by 806 and/or 808 of process 800.

At 852, a selected partition is obtained. In some embodiments, the system determines the partition that is to be split. The partition can be determined based at least in part on a previous splitting operation (e.g., the partition can correspond to a half space of the data space that was previously split). As an example, the system determines the partition based on a node of the k-d tree for which the system is traversing to cluster the data into files.

At 854, the data space for the partition is determined. In some embodiments, the system determines the boundary information for the partition. For example, the system determines the boundaries over which a previous data space was split in order to obtain the selected partition. In some embodiments, the system determines the records having key values that are bounded by the data space corresponding to the partition.

At 856, the one or more dimensions over which the data was previously split is obtained. The system can perform a look-up (e.g., with respect to the k-d tree structure) to determine a set of one or more dimensions over which the data was previously split. For example, the system determines the set of one or more dimensions over which the data was previously split in connection with assessing where in the sequence of dimensions the system is processing with respect to a current iteration of the data splitting.

At 858, a determination is made as to whether a dimension bias is to be enforced. For example, the system determines whether a data management policy or user input/request indicates whether to enforce a bias for splitting the data space along a preferred dimension(s).

In response to determining that a dimension bias is to be enforced at 858, process 850 proceeds to 860 at which the bias is obtained. For example, the system determines the preferred dimension(s) for which a splitting of the data is to be biased. As an example, the preferred dimension(s) are obtained from a data management policy, etc.

At 862, the dimension along which to split the data is determined based on the bias and the one or more dimensions over which the data was previously split.

In response to determining that a dimension bias is not to be enforced at 858, process 850 proceeds to 864 at which the dimension along which the data space is to be split is determined based on a set of dimensions over which the data was previously split.

At 866, an indication of the dimension along which to split the data is provided. In some embodiments, in response to determining the dimension along which the data space is to be split, the system provides an indication of the dimension along which a split is to be performed. For example, the system provides the indication of the dimension to a system, process, or service that invoked process 850.

At 868, a determination is made as to whether process 850 is complete. In some embodiments, process 850 is determined to be complete in response to a determination that no further splits are to be made with respect to a data space, no further clustering of data into files is to be performed, the processing of clustering data into files is paused or stopped, a user has exited the system, an administrator indicates that process 850 is to be paused or stopped, etc. In response to a determination that process 850 is complete, process 850 ends. In response to a determination that process 850 is not complete, process 850 returns to 852.

Figure 9:
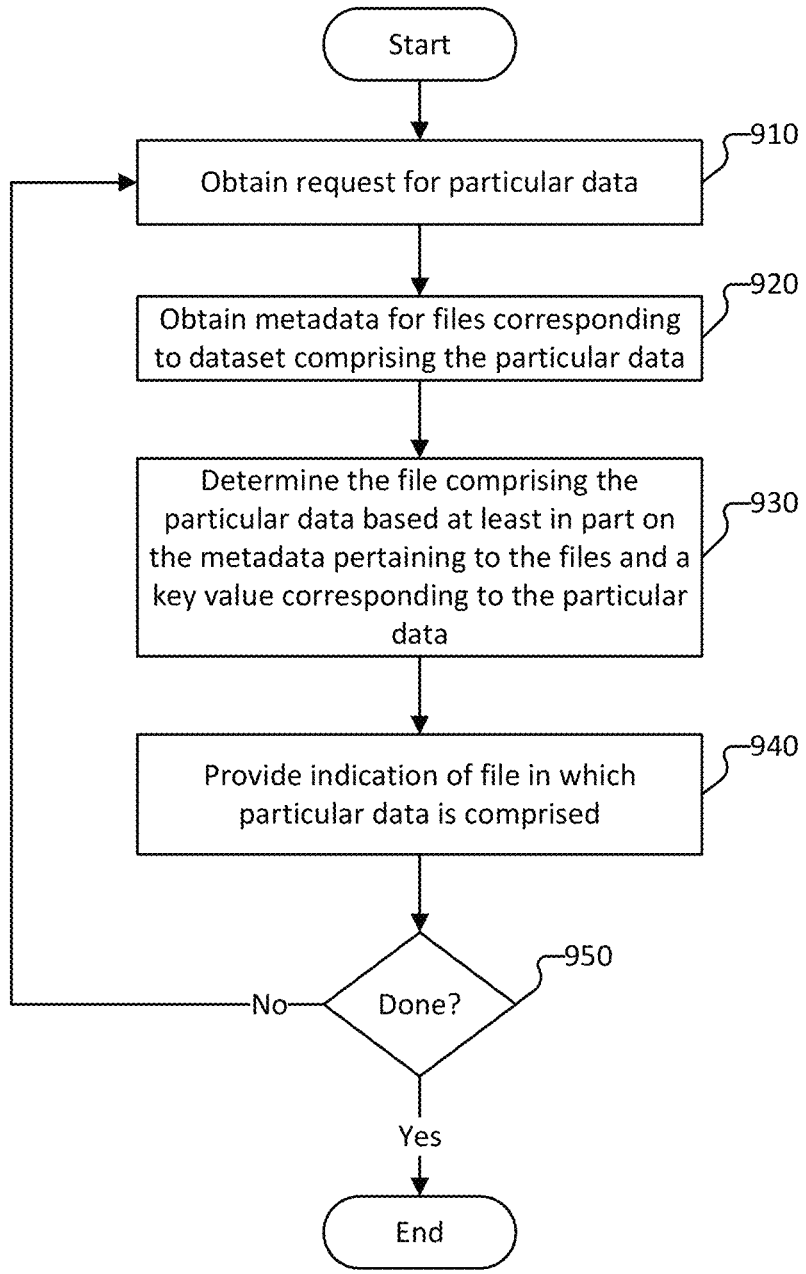
FIG. 9 is a flow diagram of a method for determining a file to access in connection with obtaining certain data according to various embodiments of the present application.

FIG. 9 is a flow diagram of a method for determining a file to access in connection with obtaining certain data according to various embodiments of the present application.

At 910, a request for particular data is obtained. In some embodiments, the system receives a data request from a user or another system (e.g., a data requesting service, such as a third-party service that consumes data comprised in a dataset). The data request can comprise an indication of the particular data, such as a filtering criterion (e.g., all records having a key value(s) satisfying a defined key value criterion).

At 920, metadata for files corresponding to a dataset comprising the particular data is obtained.

At 930, the file(s) comprising the particular data based at least in part on the metadata pertaining to the files and a key value corresponding to the particular data.

At 940, an indication of the file(s) comprising the particular data is provided. In some embodiments, the providing the indication of the file(s) comprises providing access to the file(s). In some embodiments, the providing the indication of the file(s) comprises communicating the file(s) to a user or system (e.g., a client system or a third-party service) associated with the request for the particular data. In some embodiments, the providing the indication of the file(s) comprises providing a location at which the file(s) are accessible. The providing a location at which the file(s) are accessible can include generating a Uniform Resource Locator (URL) and providing the URL to the user or system (e.g., a client system or a third-party service) associated with the request for the particular data. The URL may be configured to be signed with, or otherwise comprise, a credential with which the user or other system is to access the file(s).

At 950, a determination is made as to whether process 900 is complete. In some embodiments, process 900 is determined to be complete in response to a determination that no further files are to be accessed, no further requests for data are received, the processing of data access requests is paused or stopped, a user has exited the system, an administrator indicates that process 900 is to be paused or stopped, etc. In response to a determination that process 900 is complete, process 900 ends. In response to a determination that process 900 is not complete, process 900 returns to 910.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

Embodiments disclosed herein include a computer-readable medium. The computer-readable medium may include a non-transitory computer readable storage medium that includes optical memory devices (e.g., CD, DVD, HD-DVD, Blu-ray Disc, etc.), semiconductor memory devices (e.g., RAM, EPROM, EEPROM, etc.), magnetic memory devices (e.g., hard disk drive, floppy disk drive, tape drive, MRAM, etc.) or any hardware storage memory and does not include electromagnetic signals or carrier waves.

What is claimed is:

1. A system, comprising:
    one or more processors; and
    one or more computer-readable mediums storing instructions that, when executed by the one or more processors, cause the system to:
        access a set of data having a plurality of dimensions in a data space;
        partition the set of data into a set of files, comprising:

determining a target size for the set of files:
recursively splitting the set of data into partitions until each of partitions has the target size or is smaller than the target size, wherein the splitting comprises at least:
identifying a first splitting location in a first dimension of the plurality of dimensions;
splitting the set of data at the first splitting location to generate two subsets of data that are separated in the data space;
for each subset of data, identifying a second splitting location in a second dimension of the plurality of dimensions, the second dimension being perpendicular to the first dimension in the data space; and
splitting each of the two subsets of data at the respective second splitting location to generate partitioned subsets of data;
determining whether the partitioned subsets of data have the target size:
responsive to determining the partitioned subsets of data have the target size, storing each partitioned subset of data into a corresponding file of the set of files; and
store metadata associated with each of the set of files, the metadata including boundary information for each of the plurality of dimensions in the data space.

2. The system of claim 1, wherein the one or more processors are further configured to:
store information pertaining to boundaries for a plurality of files in the set of files; and
delete information of structure of a decision tree along which the set of files is split.

3. The system of claim 2, wherein the information pertaining to the boundaries for the plurality of files includes a minimum value for a first variable of the set of data and a maximum value for the first variable of the set of data for each of the plurality of files.

4. The system of claim 1, wherein boundaries for files of the set of files are non-overlapping.

5. The system of claim 1, wherein the one or more processors are further configured to determine a number of splits to perform with respect to the first dimension before a split is performed with respect to another dimension of the plurality of dimensions, the number of splits being determined based at least in part on the target size.

6. The system of claim 1, wherein a first partition of the set of data along with respect to the first dimension is determined based at least in part on the target size.

7. The system of claim 1, wherein the set of data is split with respect to the first dimension more times than the set of data is split with respect to another dimension of the plurality of dimensions.

8. The system of claim 1, wherein at least one of the first and second split locations is determined based at least in part on a distribution of a plurality of records comprised in the set of data.

9. The system of claim 8, wherein at least one of the first and second split locations is determined based on a plurality of weightings respectively associated with a plurality of records comprised in the set of data.

10. The system of claim 9, wherein the plurality of weightings is determined based on sizes for the corresponding plurality of records.

11. The system of claim 1, wherein the one or more processors are further configured to:
store information pertaining to boundaries for the set of files;
receive a request to provide an indication of a file to be accessed in order to obtain a subset of the information having a particular value with respect to a dimension of the set of data; and
determine the file to be accessed based at least in part on the indication.

12. The system of claim 11, wherein the file to be accessed is determined based on a querying of the information pertaining to the boundaries to identify the file for which the particular value is within corresponding boundaries along the dimension.

13. The system of claim 1, wherein the one or more processors are configured to determine a bias with respect to a biased dimension along which the set of data is split more than other dimensions of the set of data.

14. The system of claim 13, wherein the bias is determined based at least in part on a user setting that is configured based on a user input.

15. The system of claim 1, wherein the first split location is a middle location of the set of data in the first dimension.

16. The system of claim 1, wherein a record comprises information corresponding to one or more values respectively corresponding to one or more dimensions of the plurality of dimensions.

17. The system of claim 1, wherein the set of split locations splits the set of data into N groups along a dimension of the set of dimensions, wherein N comprises an integer greater than 1.

18. The system of claim 17, wherein N comprises 2 or 3.

19. A method, performed at a computer system comprising a processor and a computer-readable medium, comprising:
accessing a set of data having a plurality of dimensions in a data space;
partitioning the set of data into a set of files, comprising:
determining a target size for the set of files;
recursively splitting the set of data into partitions until each of partitions has the target size or is smaller than the target size, wherein the splitting comprises at least:
identifying a first splitting location in a first dimension of the plurality of dimensions;
splitting the set of data at the first splitting location to generate two subsets of data that are separated in the data space;
for each subset of data, identifying a second splitting location in a second dimension of the plurality of dimensions, the second dimension being perpendicular to the first dimension in the data space; and
splitting each of the two subsets of data at the respective second splitting location to generate partitioned subsets of data;
determining whether the partitioned subsets of data have the target size;
responsive to determining the partitioned subsets of data have the target size, storing each partitioned subset of data into a corresponding file of the set of files; and
storing metadata associated with each of the set of files, the metadata including boundary information for each of the plurality of dimensions in the data space.

20. A computer program product embodied in a non-transitory computer readable medium and comprising computer instructions, when executed by a processor, cause the processor to:

access a set of data having a plurality of dimensions in a data space;
partition the set of data into a set of files, comprising:
   determining a target size for each of the set of files;
   recursively splitting the set of data into partitions until each of partitions has the target size or is smaller than the target size, wherein the splitting comprises at least:
      identifying a first splitting location in a first dimension of the plurality of dimensions;
      splitting the set of data at the first splitting location to generate two subsets of data that are separated in the data space;
      for each subset of data, identifying a second splitting location in a second dimension of the plurality of dimensions, the second dimension being perpendicular to the first dimension in the data space; and
      splitting each of the two subsets of data at the respective second splitting location to generate partitioned subsets of data;
   determining whether the partitioned subsets of data have the target size;
   responsive to determining the partitioned subsets of data having the target size, storing each partitioned subset of data into a corresponding file of the set of files; and
store metadata associated with each of the set of files, the metadata including boundary information for each of the plurality of dimensions in the data space.

* * * * *